US012678689B2

(12) United States Patent
Aldridge et al.

(10) Patent No.: US 12,678,689 B2
(45) Date of Patent: Jul. 14, 2026

(54) CLOUD GAME QUEUEING

(71) Applicant: Backbone Labs, Inc., Vancouver, WA (US)

(72) Inventors: Timothy Aldridge, Seattle, WA (US); Casey Chow, Seattle, WA (US); Christopher Blair, Brooklyn, NY (US); Rohan Kapur, San Francisco, CA (US); Shawn O'Connor, Portland, OR (US); Maneet Khaira, Vancouver, WA (US); Kauhi Kukulukahalelaupilionaali'i Hookano, San Francisco, CA (US)

(73) Assignee: Backbone Labs, Inc., Vancouver, WA (US)

( * ) Notice: Subject to any disclaimer, the term of this patent is extended or adjusted under 35 U.S.C. 154(b) by 241 days.

(21) Appl. No.: 18/202,755

(22) Filed: May 26, 2023

(65) Prior Publication Data

US 2024/0390786 A1      Nov. 28, 2024

(51) Int. Cl.
*A63F 13/358*          (2014.01)
*A63F 13/44*           (2014.01)

(52) U.S. Cl.
CPC ............ *A63F 13/358* (2014.09); *A63F 13/44* (2014.09)

(58) Field of Classification Search
None
See application file for complete search history.

(56) References Cited

U.S. PATENT DOCUMENTS

| | | | |
|---|---|---|---|
| 3,536,908 A | 10/1970 | Oster | |
| 4,636,593 A | 1/1987 | Novak | |
| 6,213,880 B1 | 4/2001 | Sim | |
| 6,238,289 B1 | 5/2001 | Sobota | |
| 6,279,906 B1 | 8/2001 | Sanderson | |
| 6,400,352 B1 | 6/2002 | Bruneau | |
| 6,640,268 B1 | 10/2003 | Kumar | |
| 6,667,738 B2 | 12/2003 | Murphy | |
| 6,684,062 B1 | 1/2004 | Gosior | |
| 6,736,724 B1 | 5/2004 | Erikawa | |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Seng H Lim
(74) *Attorney, Agent, or Firm* — Crowell & Moring LLP

(57) ABSTRACT

Some cloud gaming and other remote game environments require a user to wait in a queue before playing a game. During this time, the user may be concerned that they will lose their place in the queue if they close the window displaying the game to do another task on the computing device. If the user decides to do something away from the computing device while waiting in the queue, it is possible that the user will be unaware when they progress out of the queue and miss their opportunity to play the game. This can be a frustrating experience for the user. The embodiments presented herein can be used to address this situation.

19 Claims, 22 Drawing Sheets

(56) References Cited

U.S. PATENT DOCUMENTS

| | | | |
|---|---|---|---|
| 6,761,462 B2 | 7/2004 | Yoshida | |
| D500,319 S | 12/2004 | Wada | |
| 6,855,057 B2 | 2/2005 | Namba | |
| 6,903,662 B2 | 6/2005 | Rix | |
| 6,965,368 B1 | 11/2005 | Andrews et al. | |
| 7,477,239 B2 | 1/2009 | Ray | |
| 7,580,728 B2 | 8/2009 | Vance et al. | |
| 7,905,627 B2 | 3/2011 | Chiang | |
| 8,368,662 B2 | 2/2013 | Argiro | |
| 8,462,810 B2 | 6/2013 | Spinar | |
| 8,558,796 B2 | 10/2013 | Giancarlo | |
| 8,568,238 B2 | 10/2013 | Walker | |
| 8,760,394 B2 | 6/2014 | Chiang | |
| 8,822,851 B2 | 9/2014 | Walker | |
| 8,972,617 B2 | 3/2015 | Hirschman | |
| 9,053,243 B2 | 6/2015 | Townsend | |
| 9,158,390 B2 | 10/2015 | Petersen | |
| 9,281,859 B1 | 3/2016 | Lee | |
| 9,295,915 B2 * | 3/2016 | Bruno, Jr. | G06F 9/5027 |
| 9,677,740 B2 | 6/2017 | Steiner | |
| 9,700,800 B2 | 7/2017 | Tokita | |
| 9,848,324 B1 | 12/2017 | Abene | |
| 9,965,116 B1 | 5/2018 | Wolter | |
| 10,025,644 B2 | 7/2018 | Iwaya et al. | |
| 10,042,480 B2 | 8/2018 | Krahenbuhl | |
| 10,254,924 B2 | 4/2019 | Missig | |
| 10,258,876 B2 | 4/2019 | Wells et al. | |
| 10,259,384 B2 | 4/2019 | Teng | |
| 10,272,325 B1 | 4/2019 | Nevarez | |
| 10,300,386 B1 * | 5/2019 | Leung | A63F 13/60 |
| 10,391,393 B2 | 8/2019 | Townley | |
| 10,409,449 B2 | 9/2019 | Takikawa | |
| 10,483,969 B2 | 11/2019 | Kontani | |
| 10,599,233 B1 | 3/2020 | Amalou | |
| 10,725,557 B2 | 7/2020 | Kontani | |
| 10,741,215 B1 | 8/2020 | Sundareson | |
| 10,751,612 B1 | 8/2020 | Urbanus | |
| 10,868,436 B1 | 12/2020 | Chen | |
| 10,893,125 B2 * | 1/2021 | Ma | H04L 67/141 |
| 10,912,991 B2 | 2/2021 | Buhr | |
| 11,000,759 B2 | 5/2021 | Palmer et al. | |
| 11,027,191 B2 | 6/2021 | Oh | |
| 11,045,723 B1 | 6/2021 | Lee | |
| 11,090,557 B2 | 8/2021 | Downs et al. | |
| 11,105,969 B2 | 8/2021 | Sasagawa | |
| 11,167,209 B2 | 11/2021 | Lu | |
| 11,298,614 B2 * | 4/2022 | Posin | A63F 13/335 |
| 11,343,354 B2 * | 5/2022 | Parekh | H04N 21/475 |
| 11,389,721 B2 | 7/2022 | Khaira et al. | |
| 11,395,961 B2 | 7/2022 | Chung | |
| 11,467,780 B1 | 10/2022 | Perez Guevara | |
| 11,528,363 B2 * | 12/2022 | Bohannon | H04L 65/4015 |
| 11,528,987 B1 | 12/2022 | Girault | |
| 11,534,681 B2 | 12/2022 | Dang | |
| 11,607,605 B1 | 3/2023 | Garrett | |
| 11,662,855 B1 | 5/2023 | Sorensen et al. | |
| 11,707,670 B2 | 7/2023 | Khaira et al. | |
| 11,819,756 B2 | 11/2023 | Lu | |
| 11,826,642 B2 | 11/2023 | Khaira et al. | |
| 11,839,810 B2 | 12/2023 | Khaira et al. | |
| 11,853,505 B1 | 12/2023 | Sorensen et al. | |
| 12,017,139 B2 | 6/2024 | Vroom | |
| 12,028,474 B2 | 7/2024 | O'Leary | |
| 12,064,699 B2 * | 8/2024 | Miura | A63F 13/533 |
| 12,070,678 B2 | 8/2024 | Maker | |
| 12,074,946 B2 * | 8/2024 | Wei | A63F 13/48 |
| 12,115,443 B2 | 10/2024 | Khaira | |
| 12,121,800 B2 | 10/2024 | Maker | |
| 12,145,052 B2 | 11/2024 | Khaira | |
| 12,145,053 B2 | 11/2024 | Khaira | |
| 12,194,374 B2 | 1/2025 | Khaira | |
| 12,263,400 B2 | 4/2025 | Lake et al. | |
| 12,268,956 B2 | 4/2025 | Khaira | |
| 12,274,933 B2 | 4/2025 | Lu | |
| 12,285,676 B2 | 4/2025 | Maker | |
| 12,303,775 B2 | 5/2025 | Yeo | |
| 12,324,983 B2 | 6/2025 | O'Connor | |
| 12,399,615 B2 | 8/2025 | Peng | |
| 12,420,178 B2 | 9/2025 | Guerrero | |
| 12,427,403 B2 | 9/2025 | Boegli | |
| 12,438,949 B2 | 10/2025 | Donlan et al. | |
| 12,551,785 B2 | 2/2026 | O'Connor | |
| 12,558,612 B2 | 2/2026 | O'Connor | |
| 2001/0027130 A1 | 10/2001 | Namba | |
| 2002/0173354 A1 | 11/2002 | Winans | |
| 2003/0235452 A1 | 12/2003 | Kraus | |
| 2004/0056781 A1 | 3/2004 | Rix | |
| 2004/0225502 A1 | 11/2004 | Bear | |
| 2005/0017953 A1 | 1/2005 | Pekka | |
| 2005/0170889 A1 | 8/2005 | Lum | |
| 2005/0172045 A1 | 8/2005 | Bermudez et al. | |
| 2005/0221894 A1 | 10/2005 | Lum | |
| 2005/0243585 A1 | 11/2005 | Marchant | |
| 2005/0247550 A1 | 11/2005 | Hamada | |
| 2006/0068911 A1 | 3/2006 | Pirich | |
| 2006/0080702 A1 | 4/2006 | Diez | |
| 2006/0132458 A1 | 6/2006 | Garfio | |
| 2006/0152628 A1 | 7/2006 | Park | |
| 2006/0234794 A1 | 10/2006 | Baseflug et al. | |
| 2006/0236002 A1 | 10/2006 | Valenci | |
| 2006/0250351 A1 | 11/2006 | Fu | |
| 2006/0256090 A1 | 11/2006 | Huppi | |
| 2006/0286943 A1 | 12/2006 | Vance | |
| 2007/0010328 A1 | 1/2007 | Yokota | |
| 2007/0060363 A1 | 3/2007 | Nguyen | |
| 2007/0091633 A1 | 4/2007 | Harrity | |
| 2007/0152965 A1 | 7/2007 | Krzyzanowski | |
| 2007/0155511 A1 | 7/2007 | Grundstedt | |
| 2007/0233291 A1 | 10/2007 | Herde | |
| 2007/0236959 A1 | 10/2007 | Tolbert | |
| 2008/0045338 A1 | 2/2008 | Walker | |
| 2008/0102960 A1 | 5/2008 | Jiao | |
| 2008/0202907 A1 | 8/2008 | Kyowski | |
| 2008/0261695 A1 | 10/2008 | Coe | |
| 2008/0294453 A1 | 11/2008 | Baird-Smith | |
| 2009/0065337 A1 | 3/2009 | Chiang | |
| 2009/0077277 A1 | 3/2009 | Vidal | |
| 2009/0219734 A1 | 9/2009 | Sawada | |
| 2009/0258713 A1 | 10/2009 | Albouyeh | |
| 2009/0284397 A1 | 11/2009 | Lee | |
| 2010/0026646 A1 | 2/2010 | Xiao | |
| 2010/0041480 A1 | 2/2010 | Wong | |
| 2010/0067424 A1 | 3/2010 | Sun | |
| 2010/0115050 A1 | 5/2010 | Sultenfuss | |
| 2010/0137033 A1 | 6/2010 | Lee | |
| 2010/0160048 A1 | 6/2010 | Rabin | |
| 2010/0259498 A1 | 10/2010 | Harison | |
| 2010/0271839 A1 | 10/2010 | Chan | |
| 2011/0009195 A1 | 1/2011 | Porwal | |
| 2011/0014984 A1 | 1/2011 | Penman et al. | |
| 2011/0084904 A1 | 4/2011 | Tan | |
| 2011/0241999 A1 | 10/2011 | Their | |
| 2011/0252344 A1 | 10/2011 | Van Os | |
| 2011/0256930 A1 | 10/2011 | Jaouen | |
| 2011/0300934 A1 | 12/2011 | Toy | |
| 2012/0007809 A1 | 1/2012 | Mahalingam | |
| 2012/0145522 A1 | 6/2012 | Lee | |
| 2012/0200475 A1 | 8/2012 | Baker | |
| 2012/0220372 A1 | 8/2012 | Cheung | |
| 2012/0225258 A1 | 9/2012 | Hill | |
| 2012/0284302 A1 | 11/2012 | Takagi | |
| 2013/0033829 A1 | 2/2013 | Furubo et al. | |
| 2013/0053146 A1 | 2/2013 | Ikeda | |
| 2013/0077346 A1 | 3/2013 | Chen | |
| 2013/0079139 A1 | 3/2013 | Gray | |
| 2013/0154958 A1 | 6/2013 | Clavin | |
| 2013/0159928 A1 | 6/2013 | Joynes | |
| 2013/0162680 A1 | 6/2013 | Perry | |
| 2013/0165180 A1 | 6/2013 | Fukuda | |
| 2013/0191625 A1 | 7/2013 | Mullens et al. | |
| 2013/0222238 A1 | 8/2013 | Sliger | |
| 2013/0225288 A1 | 8/2013 | Levin et al. | |
| 2013/0237322 A1 | 9/2013 | Sobel | |
| 2013/0249830 A1 | 9/2013 | Quek | |

(56)  References Cited

U.S. PATENT DOCUMENTS

| | | |
|---|---|---|
| 2013/0274018 A1 | 10/2013 | Zalewski |
| 2013/0298208 A1 | 11/2013 | Ayed |
| 2013/0303244 A1 | 11/2013 | Jensen |
| 2014/0018173 A1 | 1/2014 | Urhman |
| 2014/0024392 A1 | 1/2014 | Su |
| 2014/0109133 A1 | 4/2014 | Kitazato |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0206451 A1 | 7/2014 | Helmes |
| 2014/0274394 A1 | 9/2014 | Willis |
| 2014/0304494 A1 | 10/2014 | Hawver |
| 2014/0317329 A1 | 10/2014 | Barnett et al. |
| 2014/0365214 A1 | 12/2014 | Bayley |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0103015 A1 | 4/2015 | Berglund |
| 2015/0105152 A1 | 4/2015 | Bellinghausen |
| 2015/0128042 A1 | 5/2015 | Churchill et al. |
| 2015/0182856 A1 | 7/2015 | Mays, III |
| 2015/0185998 A1 | 7/2015 | Xing |
| 2015/0217191 A1 | 8/2015 | Yan |
| 2015/0231498 A1 | 8/2015 | Hain |
| 2015/0273325 A1 | 10/2015 | Falc et al. |
| 2015/0281422 A1 | 10/2015 | Kessler et al. |
| 2016/0062489 A1 | 3/2016 | Li |
| 2016/0089600 A1 | 3/2016 | Mays, III |
| 2016/0132114 A1 | 5/2016 | Rihn |
| 2016/0180811 A1 | 6/2016 | Colenbrander |
| 2016/0184712 A1 | 6/2016 | Colenbrander |
| 2016/0234264 A1 | 8/2016 | Coffman |
| 2016/0283063 A1 | 9/2016 | Missig |
| 2016/0313912 A1 | 10/2016 | Keam |
| 2016/0317919 A1 | 11/2016 | Gassoway et al. |
| 2016/0329533 A1 | 11/2016 | Tajima |
| 2016/0378226 A1 | 12/2016 | McCarthy, III |
| 2017/0056762 A1 | 3/2017 | Gafni |
| 2017/0072307 A1 | 3/2017 | Perry |
| 2017/0142201 A1 | 5/2017 | Holmes |
| 2017/0173461 A1 | 6/2017 | Pack |
| 2017/0189800 A1 | 7/2017 | Crain |
| 2017/0205881 A1 | 7/2017 | Yamashita |
| 2017/0239468 A1 | 8/2017 | Lemke |
| 2017/0239569 A1 | 8/2017 | Shiraiwa |
| 2017/0340957 A1 | 11/2017 | Cochenour |
| 2017/0354878 A1* | 12/2017 | Posin ..................... A63F 13/35 |
| 2017/0354884 A1 | 12/2017 | Benedetto |
| 2018/0001216 A1 | 1/2018 | Bruzzo |
| 2018/0004250 A1 | 1/2018 | Barnett et al. |
| 2018/0056176 A1 | 3/2018 | Sakamoto |
| 2018/0056180 A1 | 3/2018 | Russell |
| 2018/0070389 A1 | 3/2018 | Morgan |
| 2018/0097860 A1 | 4/2018 | Daly |
| 2018/0104574 A1 | 4/2018 | Tager |
| 2018/0121655 A1 | 5/2018 | Abene |
| 2018/0133594 A1 | 5/2018 | Guo |
| 2018/0217662 A1 | 8/2018 | Smoot |
| 2018/0250588 A1 | 9/2018 | Winick |
| 2018/0280802 A1 | 10/2018 | Stroud |
| 2018/0345136 A1 | 12/2018 | Schmitz et al. |
| 2018/0345139 A1 | 12/2018 | Smith |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0134499 A1 | 5/2019 | Lee |
| 2019/0230400 A1 | 7/2019 | Van Os |
| 2019/0286817 A1 | 9/2019 | Butler |
| 2019/0354183 A1 | 11/2019 | Swindells |
| 2019/0358534 A1 | 11/2019 | Fang et al. |
| 2019/0379231 A1 | 12/2019 | Gonzalez et al. |
| 2020/0026387 A1 | 1/2020 | Barel |
| 2020/0155928 A1 | 5/2020 | Guo |
| 2020/0206636 A1 | 7/2020 | Schultz et al. |
| 2020/0238181 A1 | 7/2020 | Fang |
| 2020/0278758 A1 | 9/2020 | McAllen |
| 2020/0282309 A1 | 9/2020 | Liao |
| 2020/0298110 A1 | 9/2020 | Koziel |
| 2020/0316463 A1 | 10/2020 | Itay |
| 2020/0346121 A1 | 11/2020 | Beaumont |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0126984 A1* | 4/2021 | Parekh .............. H04N 21/4882 |
| 2021/0154584 A1 | 5/2021 | O'Connor et al. |
| 2021/0197082 A1 | 7/2021 | Seibert et al. |
| 2021/0200501 A1 | 7/2021 | Stankoulov |
| 2021/0205699 A1 | 7/2021 | Chung |
| 2021/0275907 A1 | 9/2021 | Khaira et al. |
| 2021/0291062 A1* | 9/2021 | Tulewicz .............. A63F 13/795 |
| 2021/0299553 A1 | 9/2021 | Lu et al. |
| 2021/0308566 A1 | 10/2021 | Kong et al. |
| 2021/0326145 A1 | 10/2021 | Wu |
| 2021/0349586 A1 | 11/2021 | Tsuchikawa |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0039280 A1 | 2/2022 | Guerrero, Jr. |
| 2022/0040573 A1 | 2/2022 | Fear |
| 2022/0096921 A1 | 3/2022 | Nielsen |
| 2022/0096923 A1 | 3/2022 | O'Leary et al. |
| 2022/0135273 A1 | 5/2022 | Malone |
| 2022/0233950 A1 | 7/2022 | Larson |
| 2022/0272432 A1 | 8/2022 | Schillebeeckx |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0048793 A1 | 2/2023 | Lee |
| 2023/0068209 A1 | 3/2023 | Han |
| 2023/0085053 A1 | 3/2023 | Young |
| 2023/0092439 A1 | 3/2023 | Dang |
| 2023/0105605 A1 | 4/2023 | Lu et al. |
| 2023/0136977 A1* | 5/2023 | Miura ..................... A63F 13/35 |
| | | 463/31 |
| 2023/0182011 A1 | 6/2023 | Vroom et al. |
| 2023/0211235 A1 | 7/2023 | Xu |
| 2023/0256330 A1 | 8/2023 | Lu et al. |
| 2023/0271082 A1 | 8/2023 | Khaira et al. |
| 2023/0356076 A1 | 11/2023 | Maker |
| 2023/0421696 A1* | 12/2023 | Bohannon ........... H04L 63/0838 |
| 2024/0009564 A1 | 1/2024 | Schembri |
| 2024/0042313 A1 | 2/2024 | Benedetto |
| 2024/0070218 A1* | 2/2024 | Gazit .................. G06F 16/9577 |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1* | 5/2024 | Wei .................... H04N 21/4781 |
| 2024/0157258 A1 | 5/2024 | Maker |
| 2024/0176483 A1 | 5/2024 | Peng |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0207729 A1 | 6/2024 | McDole |
| 2024/0226721 A1 | 7/2024 | Lake et al. |
| 2024/0299844 A1 | 9/2024 | Vroom et al. |
| 2024/0307760 A1 | 9/2024 | Aldridge et al. |
| 2024/0325878 A1 | 10/2024 | Poitrey |
| 2024/0333804 A1 | 10/2024 | Wei et al. |
| 2024/0390786 A1 | 11/2024 | Aldridge et al. |
| 2025/0025773 A1 | 1/2025 | Maker |
| 2025/0025776 A1 | 1/2025 | Maker |
| 2025/0032900 A1 | 1/2025 | Khaira |

(56) References Cited

U.S. PATENT DOCUMENTS

| | | | |
|---|---|---|---|
| 2025/0032901 A1 | 1/2025 | Boegli | |
| 2025/0032903 A1 | 1/2025 | Khaira | |
| 2025/0032904 A1 | 1/2025 | Khaira | |
| 2025/0032913 A1 | 1/2025 | Abe | |
| 2025/0041712 A1 | 2/2025 | Khaira | |
| 2025/0058213 A1 | 2/2025 | Khaira et al. | |
| 2025/0090945 A1 | 3/2025 | Koch et al. | |
| 2025/0090946 A1 | 3/2025 | Koch et al. | |
| 2025/0090947 A1 | 3/2025 | Khaira et al. | |
| 2025/0099847 A1 | 3/2025 | Guerrero | |
| 2025/0099848 A1 | 3/2025 | Yeo | |
| 2025/0114691 A1 | 4/2025 | Poitrey | |
| 2025/0128152 A1 | 4/2025 | Khaira et al. | |
| 2025/0153035 A1 | 5/2025 | Torres et al. | |
| 2025/0153045 A1 | 5/2025 | O'Connor et al. | |
| 2025/0269271 A1 | 8/2025 | Lake et al. | |
| 2025/0281827 A1 | 9/2025 | Maker | |
| 2025/0352891 A1 | 11/2025 | Guerrero | |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 109062842 A | 12/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 3224691 B1 | 4/2018 |
| EP | 3375502 A1 | 9/2018 |
| EP | 3782709 A1 | 2/2021 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO 2021/178242 A1 | 9/2021 |
| WO | WO2022/161834 A1 | 8/2022 |
| WO | WO 2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |
| WO | WO2024/248845 A1 | 12/2024 |
| WO | WO 2025/029566 A1 | 2/2025 |
| WO | WO2025/042684 A1 | 2/2025 |
| WO | WO2025/058942 A1 | 3/2025 |

OTHER PUBLICATIONS

US 12,047,455 B2, 07/2024, Wei et al. (withdrawn)

Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.

GameSir G8 Plus Bluetooth Mobile Controller—Big Enough As You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.

Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.

Nintendo Switch—Nintendo—Official Site, obtained from the Internet on Oct. 10, 2024; URL: https://www.nintendo.com/us/switch/system/, 17 pages.

Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglscJv9w%26pid%3dImgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=1&itb=0&ajaxhist=0&ajaxserp=0, 4 pages.

Office Action in U.S. Appl. No. 17/504,260, dated Jul. 23, 2024.

International Search Report and Written Opinion of the International Searching Authority issued in International Application No. PCT/US2024/019901, mailed Jul. 17, 2024 (15 pages).

Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.

Office Action in U.S. Appl. No. 17/856,895, dated Mar. 12, 2024.

International Search Report and Written Opinion of the International Searching Authority issued in International Application No. PCT/US2023/036609, mailed Feb. 12, 2024 (15 pages).

International Search Report and Written Opinion of the International Searching Authority issued in International Application No. PCT/US2023/079518, mailed Feb. 9, 2024 (12 pages).

U.S. Appl. No. 18/076,121, filed Dec. 6, 2022 entitled "Contextually-Aware Platform Service Switcher."

U.S. Appl. No. 18/076,146, filed Dec. 6, 2022 entitled "System and Method for Automatic Content Capability Detection."

U.S. Appl. No. 18/076,172, filed Dec. 6, 2022 entitled "System and Method for Rich Content Browsing Multitasking on Device Operating Systems with Multitasking Limitations."

U.S. Appl. No. 18/136,509, filed Apr. 19, 2023 entitled "Universal Mobile Game Controller."

U.S. Appl. No. 18/214,917, filed Jun. 27, 2023 entitled "Game Controller with Play-on-Any-Screen Feature."

U.S. Appl. No. 18/214,949, filed Jun. 27, 2023 entitled "Software-Enabled Mobile Game Controller with Integrated Platform Operating Service."

U.S. Appl. No. 18/226,883, filed Jul. 27, 2023 entitled "Platform-Customized Mobile Game Controller and Methods for Use Therewith."

U.S. Appl. No. 18/226,892, filed Jul. 27, 2023 entitled "Mobile Game Controller and Method for Connecting to a Wireless Audio Device."

Sholtz, M.; "The Razer Kishi V2 offers a new Virtual Controller mode, and it's pretty slick"; Android Police Newsletter article; downloaded from the Internet on Aug. 16, 2023 at *The Razer Kishi V2 offers a new Virtual Controller mode, and it's pretty slick* (*androidpolice.com*) ; Jan. 21, 2023; 7 pages.

"Rayz Pro"; Pioneer Rayz™ Pro earbuds product page; downloaded from the Internet on Aug. 16, 2023 at *Rayz Pro Earphone—Pioneer Rayz*; Pioneer Rayz; 2023; 9 pages.

International Search Report and Written Opinion of the International Searching Authority issued in International Application No. PCT/US2021/019941, mailed Jun. 9, 2021 (11 pages).

U.S. Appl. No. 16/693,080, filed Nov. 2019, O'Connor.

(56)　　　　　References Cited

OTHER PUBLICATIONS

U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/987,772, filed Nov. 2022, Sorensen.
U.S. Appl. No. 18/086,077, filed Dec. 2022, Maker.
U.S. Appl. No. 18/086,103, filed Dec. 2022, Maker.
U.S. Appl. No. 18/138,377, filed Apr. 2023, Sorensen et al.
U.S. Appl. No. 18/195,152, filed May 2023, Khaira.
U.S. Appl. No. 18/224,508, filed Jul. 2023, Maker.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Agglication No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.
Notice of allowance in U.S. Appl. No. 17/504,299, dated Apr. 15, 2024.

Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].
U.S. Appl. No. 17/866,166, filed Jul. 15, 2022 entitled "Game Controller for a Mobile Device with Flat Flex Connector."
U.S. Appl. No. 17/866,234, filed Jul. 15, 2022 entitled "Game Controller for a Mobile Device with Extended Bumper Button."
"Backbone One"; Mobile gaming hardware product page; Backbone; Dec. 9, 2022; 7 pages.
"Digital Depth: ALL Controller Universal & Fully Customizable"; Kickstarter project page for customizable game controller; Digital Depth Inc.; Aug. 4, 2021; 25 pages.
"PhoneJoy Play: Turn your phone into a console!"; Kickstarter project page for compact gamepad; PhoneJoy Solutions America, Inc.; Jul 29, 2014; 42 pages.
"Picture-in-picture (PIP) support"; Android Developers UI Guide; downloaded from the Internet on Nov. 27, 2022 at https://developer.android.com/develop/ui/views/picture-in-picture; Nov. 11, 2022; 10 pages.
"AVPictureInPictureController: A controller that responds to user-initiated Picture in Picture playback of Video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"Picture-in-Picture API—Web APIs / MDN"; downloaded from the Internet on Nov. 27, 2022 at https://developer.rnozilla.org/en-US/docs/Web/API/Picture-in-Picture API; Mozilla Corporation; Oct. 10, 2022; 4 pages.
"How to implement Picture in Picture WebView on IOS Swift?"; StackOverflow Questions; downloaded from the Internet on Nov. 28, 2022 at https://stackoverflow.com/guestions/69565199/how-to-implement-picture-in-picture-webview-on-ios-swift; StackOverflow; Oct. 14, 2021; 2 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Gamepass App now supports Picture in Picture"; Reddit, xcloud comments; downloaded from the Internet on Nov. 28, 2022 at https://www.reddit.com/r/Xcloud/comments/mvathi/gamepass_app_now_supports_picture_in_picture/; Reddit Inc.; 2022; 6 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.

(56) References Cited

OTHER PUBLICATIONS

"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.

Max Tech; Backbone One Review—The BEST iPhone Gaming Controller!; YouTube product review video; downloaded from the Internet on Nov. 29, 2022 at https://www. youtube.com/watch?v=zRJQjt2nzDo; YouTube; Jun. 2022; 4 pages.

"Game Center"; Apple Developer Game Center overview; downloaded from the Internet on Nov. 29, 2022 at https://developer.apple.com/game-center/; Apple Inc.; 2022; 4 pages.

Tech & Design; "How to Set Up New Nintendo Switch | Beginners Guide | First Time Turning On"; YouTube product review Video; downloaded from the Internet on Nov. 29, 2022 at https://www.youtube.com/watch?V=XtMcQ9IAkCc; YouTube; 2021; 4 pages.

Box.co.uk; "How Does the Samsung Gaming Hub Work?"; YouTube product tutorial; downloaded from the Internet on Nov. 29, 2022 at https://www.youtube.com/watch?V=uAT4tZR3mNk; YouTube; Oct. 2022; 5 pages.

"Why queue in geforce now so long? I try to answer for this question" Reddit, GeForceNOW comments; downloaded from the Internet on Jun. 7, 2023 at *why queue in geforce now so long? I try to answer for this question : r/GeForceNOW (reddit.com)*; Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.

Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.

Faulkner, C.; "Backbone's excellent phone controller is now shipping for Android'" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at *Xbox Cloud Gaming 'Lots of people are playing' Fix: Why is queue taking so long?—GameRevolution*; Game Revolution; Dec. 13, 2021; 6 pages.

Osterberg, J.; "Picture in Picture Across All Platforms"; Kodeco / iOS & Swift Tutorials; downloaded from the Internet on Nov. 28, 2022 at https://www.kodecocom/24247382-picture-in-picture-across-all-platforms; Jul. 26, 2021; 14 pages.

Schofield, T.; "Logitech G Cloud Unboxing and Hands On?"; YouTube product review video; downloaded from the Internet on Nov. 29, 2022 at https://www. youtube.com/watch?v=speoPL5vqX0; YouTube; Nov. 2022; 3 pages.

Voorhees, J.; "Deeper Controller Support and a Revitalized Game Center: Exploring Apple's 2020 Gaming Updates"; MaCStories Weekly Extras; downloaded from the Internet on Nov. 29, 2022 at https://www.macstories.net/stories/deeper-controller-support-and-a-revitalized-game-center-exploring-apples-2020-garning-updates/; MacStories, Inc.; Aug. 27, 2020; 14 pages.

Notice of allowance in U.S. Appl. No. 17/504,283, dated May 29, 2024.

Notice of allowance in U.S. Appl. No. 17/504,299, dated Jun. 12, 2024.

Notice of allowance in U.S. Appl. No. 17/856,895, dated Jun. 12, 2024.

Notice of allowance in U.S. Appl. No. 18/076,146, dated Jun. 13, 2024.

Notice of allowance in U.S. Appl. No. 18/086,103, dated May 28, 2024.

International Search Report and Written Opinion of the International Searching Authority issued in International Application No. PCT/US2023/079521, mailed May 24, 2024 (15 pages).

U.S. Appl. No. 19/013,753 filed Jan. 2025, Khaira.

U.S. Appl. No. 63/743,503 filed Jan. 2025, Khaira.

Notice of allowance in U.S. Appl. No. 18/405,077, dated Dec. 26, 2024.

Notice of allowance in U.S. Appl. No. 18/405,077, dated Jan. 13, 2025.

Notice of allowance in U.S. Appl. No. 18/734,411 dated Jan. 13, 2025.

Office Action in U.S. Appl. No. 18/076,172, dated Jan. 10, 2025.

International Preliminary Reporty on Patentability in International Application No. PCT/US2023/031919, mailed Jan. 16, 2025.

U.S. Appl. No. 18/813,384, filed Aug. 2024, Maker.

U.S. Appl. No. 18/915,580, filed Oct. 2024, Khaira et al.

U.S. Appl. No. 18/915,648, filed Oct. 2024, Khaira et al.

U.S. Appl. No. 18/942,103, filed Nov. 2024, Scott et al.

U.S. Appl. No. 18/945,830, filed Nov. 2024, Khaira et al.

U.S. Appl. No. 18/962,755, filed Nov. 2024, Khaira et al.

U.S. Appl. No. 18/967,940, filed Dec. 2024, Khaira et al.

Notice of allowance in U.S. Appl. No. 17/504,260, dated Dec. 9, 2024.

Notice of allowance in U.S. Appl. No. 18/405,077, dated Dec. 12, 2024.

Office Action in U.S. Appl. No. 18/076,172, dated Dec. 2, 2024.

International Search Report and Written Opinion of the International Searching Authority issued in International Application No. PCT/US2024/039193, mailed Nov. 11, 2024 (16 pages).

International Search Report and Written Opinion of the International Searching Authority issued in International Application No. PCT/US2024/039487, mailed Nov. 18, 2024 (20 pages).

International Search Report and Written Opinion of the International Searching Authority issued in International Application No. PCT/US2024/042461, mailed Nov. 12, 2024 (13 pages).

Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 p. 3, 5 pages.

Anonymous: "Remote Play", Wikipedia, dated Jun. 30, 2023, XP093217737, Retrieved from the Internet: URL:https://en.wikipedia.org/w/index.php?title=Remote_PIay&oldid=1162598770, 9 pages.

ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.

U.S. Appl. No. 63/770,124, filed Mar. 2025, Khaira.

U.S. Appl. No. 63/781,523, filed Apr. 2025, Khaira.

Office Action in U.S. Appl. No. 18/086,077, dated Mar. 14, 2025.

Office Action in U.S. Appl. No. 18/136,509, dated Apr. 1, 2025.

Jovanee, Alice, The new 8Bitdo Ultimate controller comes in October, https://www.theverge.com/2022/8/30/23326887/8bitdo-uIti mate-pro-control ler-bluetooth-preorder-nintendo-switch-wireless, Aug. 30, 2022 (Year: 2022), 3 pages.

Lon.tv, GameSir X2 USB-C Android Game Controller Review (Newest Version), https://www.youtube.com/watch?v=9Kztm8D6qk, Nov. 24, 2021 (Year: 2021), 8 pages.

U.S. Appl. No. 18/746,611, filed Jun. 2024, Ivan Torres.

U.S. Appl. No. 18/739,527, filed Jun. 2024, Hong Tai Wei.

Notice of allowance in U.S. Appl. No. 18/076,146, dated Jul. 22, 2024.

Notice of allowance in U.S. Appl. No. 18/086,103, dated Jul. 9, 2024.

Notice of allowance in U.S. Appl. No. 18/195,152, dated Jul. 23, 2024.

Notice of allowance in U.S. Appl. No. 18/224,508, dated Jun. 21, 2024.

Office Action, Advisory Action, in U.S. Appl. No. 17/504,260, dated Nov. 14, 2024.

Walmart.com; search, obtained from the Internet on Nov. 17, 2024; URL: https://www.walmart.com/search?q=for+Apple+MagSafe+Charger%2C+Wireless +Charger+with+Fast+Charging+Capability%2C+Type+C+Wall+Charger%2C+Compatible+for+iPhone+and+AirPods; 3 pages.

(56)     References Cited

OTHER PUBLICATIONS

M-Con; obtained from the Internet on Nov. 17, 2024; URL: https:// www.m-con.co/; 6 pages.
U.S. Appl. No. 18/734,411, filed Jun. 2024, Maker.
U.S. Appl. No. 18/777,919, filed Jul. 2024, Khaira et al.
U.S. Appl. No. 18/805,902, filed Aug. 2024, Khaira et al.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
Notice of allowance in U.S. Appl. No. 17/856,895, dated Apr. 16, 2024.
Office Action in U.S. Appl. No. 18/405,077, dated May 7, 2024.
International Search Report and Written Opinion of the International Searching Authority issued in International Application No. PCT/US2024/010404, mailed Apr. 24, 2024 (16 pages).
U.S. Appl. No. 19/068,177, entitled: "Open and Close Features for Game Controller Bridge", first named inventor: Jon Christopher Lake, filed Mar. 3, 2025.
U.S. Appl. No. 19/096,915, entitled: "Dynamicatly Changing Button Indicia for a Game Controller", first named inventor: Ozhan Maker, filed Apr. 1, 2025.
U.S. Appl. No. 19/318,687, entitled: "Contextually-Aware Platform Service Switcher", first named inventor: Joshua Donlan, filed Sep. 4, 2025.
U.S. Appl. No. 19/321,509, entitled: "Mobile Game Controller and Method for Connecting to a Wireless Audio Device", first named inventor: Samuel Boegli, filed Sep. 8, 2025.
U.S. Appl. No. 19/454,716, entitled: "Universal Mobile Game Controller", first named inventor: Shawn O'Connor, filed Jan. 21, 2026.
U.S. Appl. No. 19/454,733, entitled: "Universal Mobile Game Controller", first named inventor: Shawn O'Connor, filed Jan. 21, 2026.
Notice of allowance in U.S. Appl. No. 18/226,892, dated Aug. 29, 2025.
Notice of allowance in U.S. Appl. No. 18/237,680, dated Nov. 3, 2025.
Notice of allowance in U.S. Appl. No. 18/237,698, dated Oct. 22, 2025.
Office Action in U.S. Appl. No. 18/076,172, dated Sep. 2, 2025.
Office Action in U.S. Appl. No. 18/202,755, dated Oct. 23, 2025.
Office Action in U.S. Appl. No. 18/214,949, dated Mar. 9, 2026.
Office Action in U.S. Appl. No. 18/226,883, dated Dec. 1, 2025.
Office Action in U.S. Appl. No. 18/237,680, dated Aug. 7, 2025.
Office Action in U.S. Appl. No. 18/242,672, dated Oct. 27, 2025.
Office Action in U.S. Appl. No. 18/369,000, dated Jan. 22, 2026.
Office Action in U.S. Appl. No. 18/388,922, dated Sep. 30, 2025.
Office Action in U.S. Appl. No. 18/389,063, dated Mar. 20, 2026.
Office Action in U.S. Appl. No. 18/805,902, dated Mar. 26, 2026.
Office Action, Restriciien Requirement, in U.S. Appl. No. 18/214,917, dated Dec. 30, 2025.
Office Action, Restriction Requirement, in U.S. Appl. No. 18/369,025, dated Mar. 9, 2026.
Office Action, Restriction Requirement, in U.S. Appl. No. 18/389,063, dated Oct. 27, 2025.
Office Action, Restriction Requirement, in U.S. Appl. No. 18/739,527, dated Dec. 31, 2025.
Office Action, Restriction Requirement, in U.S. Appl. No. 18/777,919, dated Mar. 25, 2026.
Joe Skrebels, Cyberpunk 2077 Xbox Controller Contains a Neat Easter Egg, Jul. 4, 2022, https://web.archive.org/web/20220704064405/ https:/www.ign.com/articles/cyberpunk-2077-controller-soundtrack-qr-code-arg , p. 1-2 (Year: 2022).
Lauryn Strampe, Review: Backbone One, Oct. 28, 2021, https:// web.archive.org/web/20211028155054/https:/www.wired.com/review/ backbone-one-iphone-controller/, p. 1-8 (Year: 2021).
Lon. Tv, Backbone One Game Controller for iPhone Review, Jul. 7, 2021, https://www.youtube.com/watch?v=fv8qba1 niug , time 0:00-12:00, p. 1 (Year: 2021).
Luis Alamilla, TH IS Changes PS5 and XBOX Remote Play | Backbone One Controller Review, May 27, 2021, https://www. youtube.com/watch?v=tJrDhvy2Ffg, time 0:00-4:24, p. 1 (Year: 2021).
Peter Likes Photography and Cosplay, Backbone One iOS Review—Steam Link, PS Remote Play, and Xcloud tested, Oct. 17, 2021, https://www.youtube.com/watch?v=f3FfgXogToc, time 0:00-10:30, p. 1 (Year: 2021).
Reviews 2 Go, Control: Ultimate Edition—Cloud Version (Switch) Review, Nov. 2, 2020, https://www.youtube.com/watch?v= OeANrOtSSpw, time 0:00-8:54, p. 1 (Year: 2020).
Saunderverse, How to close out of a game/app on Nintendo Switch OLEO, Oct. 9, 2021, https://www.youtube.com/watch?v= 9kZBfjUYiPg, time 0:00-0:48, p. 1 (Year: 2021).
Tech Tips, Nintendo Switch: How to Close a Game, Dec. 4, 2021, https://www.youtube.com/watch?v=m5FoRvN_5pM ,time 0:00-1:01, p. 1 (Year: 2021).
Wesley Hilliard, Backbone One i Phone controller users get new features with optional subscription, Nov. 4, 2021, https://web.archive. org/web/20211104170551/https:/appleinsider.com/articles/21/11/04/ backbone-one-iphone-controller-users-get-new-features-with-optional-subscription , p. 1-4 (Year: 2021).
U.S. Appl. No. 19/068,177, filed Mar. 2025, Lake et al.
U.S. Appl. No. 19/096,915, filed Apr. 2025, Maker.
Notice of allowance in U.S. Appl. No. 18/136,509 dated Apr. 24, 2025.
Office Action in U.S. Appl. No. 18/076,121, dated Apr. 16, 2025.
Office Action in U.S. Appl. No. 18/076,372, dated May 12, 2025.
Office Action in U.S. Appl. No. 18/202,755, dated May 7, 2025.
Office Action in U.S. Appl. No. 18/226,883, dated Jun. 6, 2025.
Office Action in U.S. Appl. No. 18/226,892, dated Jun. 2, 2025.
International Preliminary Report on Patentability in International Application No. PCT/US2023/036609, mailed May 15, 2025.
International Preliminary Report on Patentability in International Application No. PCT/US2023/079518 mailed May 22, 2025.
International Preliminary Report on Patentability in International Application No. PCT/US2023/079521 mailed May 22, 2025.
International Search Report and Written Opinion of the International Searching Authority issued in International Application No. PCT/ US2024/045554, mailed Dec. 12, 2024.

* cited by examiner

Cloud Queuing: User Queue Flow

Cloud Queuing: User Queue Progressed

Cloud Queuing: User Queue Finished

CLOUD GAME QUEUEING

BACKGROUND

A controller can be used with a computing device to select and/or interact with content using user input elements on the controller. The content can be locally-stored on the computing device and/or streamed from a remote device. For example, the controller can be a game controller used to play a game that is native to the computing device and/or to play a game that is streamed from a cloud streaming service to a browser of the computing device.

Figure 1:
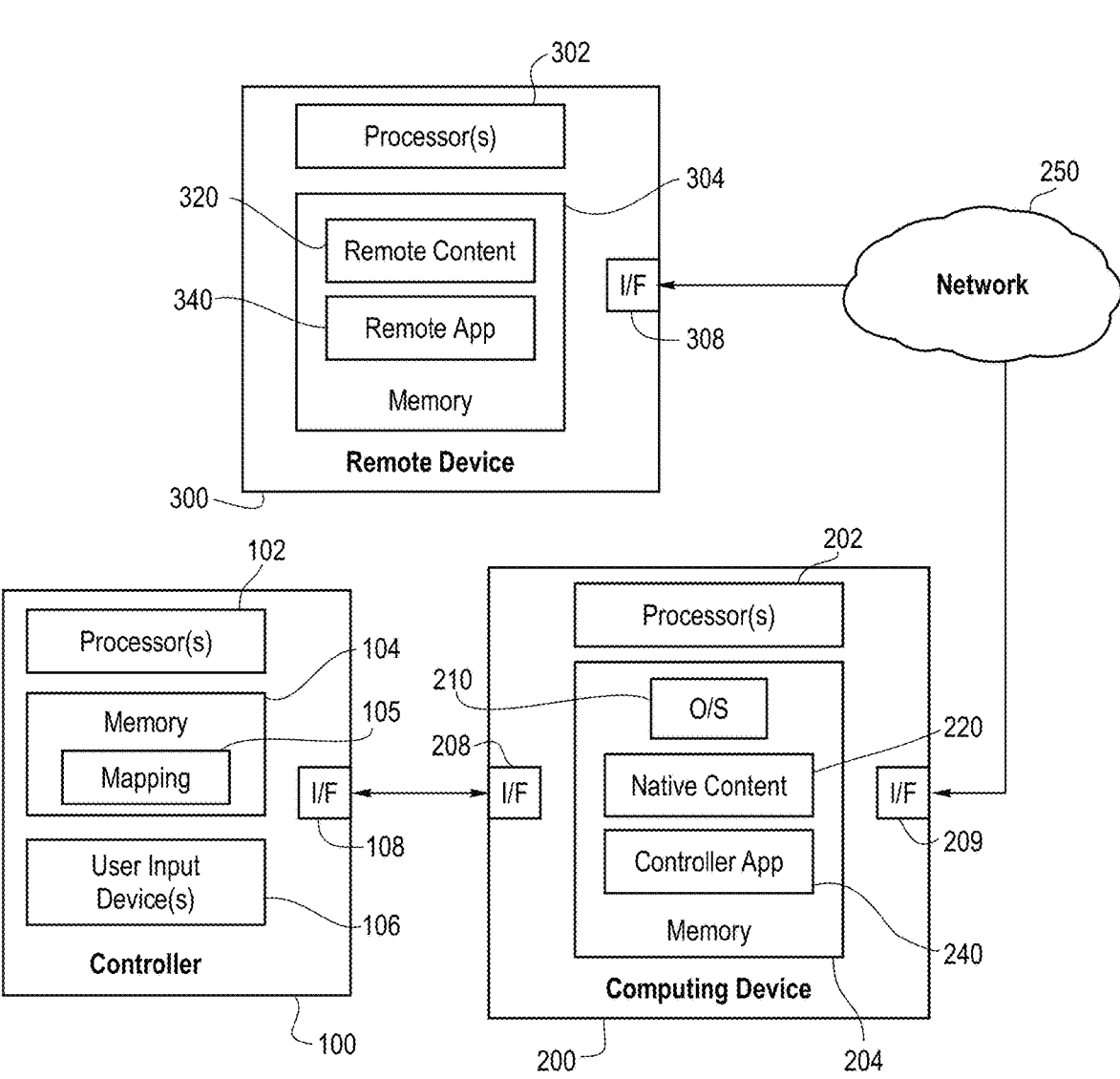
FIG. 1 is a diagram of an example computing environment of an embodiment.

The drawings are for purposes of illustrating example embodiments, but it should be understood that the claims are not limited to the arrangements and instrumentality shown in the drawings.

DETAILED DESCRIPTION

Introduction

As will be described in more detail below, some cloud gaming and other remote game environments require a user to wait in a queue before playing a game. During this time, the user may be concerned that they will lose their place in the queue if they close the window displaying the game to do another task on the computing device. If the user decides to do another activity on their computing device while waiting in the queue, it is possible that the user will be unaware when they progress out of the queue and miss their opportunity to play the game. This can be a frustrating experience for the user.

The following embodiments provide ways for a user to multitask on the computing device while waiting in one or more cloud game queues. In one embodiment, a computing device is provided comprising one or more processors, a non-transitory computer-readable medium, and program instructions stored on the non-transitory computer-readable medium. The program instructions, when executed by the one or more processors, cause the one or more processors to perform functions comprising: displaying a browser on the computing device to launch a game on a cloud streaming service in response to a request from a user, wherein the cloud streaming service places the user in a queue prior to allowing the user to play the game; receiving, from a server, additional program instructions that, when executed by the one or more processors, further cause the one or more processors to perform functions comprising obtaining information about the user's wait in the queue; receiving a signal from a game controller in communication with the computing device indicating actuation of a user input element of the game controller; and in response to receiving the signal from the game controller: hiding a display of the browser without closing the browser so the user's position in the queue is not lost; obtaining information about the user's wait time in the queue using the additional program instructions received from the server; and displaying the information about the user's wait in the queue.

In another embodiment, a method is provided that is performed in a computing device coupled with a mobile game controller. The method comprises: launching a game from a remote game service, wherein a user is placed in a queue prior to being able to play the game; receiving a signal from the mobile game controller; and in response to receiving the signal from the game controller; removing a display of the game without causing the user's position in the queue to be lost; obtaining information about the user's wait in the queue; and displaying the information about the user's wait in the queue.

In yet another embodiment, a non-transitory computer-readable medium is provided that stores program instructions that, when executed by one or more processors in a server, cause the one or more processors to perform functions comprising: receiving, from a computing device, an identification of a game that a user of the computing device is attempting to play, wherein the game places the user in a queue prior to allowing the user to play the game; and sending, to the computing device, additional program instructions that, when executed by one or more processors in the computing device, cause the one or more processors in the computing device to perform functions comprising obtaining information about the user's wait in the queue.

Other embodiments could include a platform where the queue is to enter the gameplay state of the platform and then the user selects a game from there Other embodiments are provided, and any of the embodiments described herein can be used alone or in combination with one another.

Before turning to a description of example implementations, the following section provides an overview of an exemplary computing environment. It should be understood that these are merely examples and other implementations can be used. Accordingly, none of the details presented herein should be read into the claims unless expressly recited therein.

Overview of an Exemplary Computing Environment

Turning now to the drawings, FIG. 1 is an illustration of a computing environment of an embodiment. As shown in FIG. 1, this environment comprises a user controller 100 (e.g., a game controller), a computing device 200 (e.g., a mobile phone), and a remote device 300 (e.g., a server). The user controller 100 and computing device 200 are in communication with each other via respective wired or wireless interfaces 108, 208. Likewise, the computing device 200 and the remote device 300 are in communication with each other via wired or wireless interfaces 209, 308. As used herein, "in communication with" can mean in direct communication with or in indirect communication with via one or more components, which may or may not be mentioned herein. For example, in the embodiment shown in FIG. 1, the computing device 200 and the remote device 300 are in communication with each other via a network 250 (e.g., the Internet, a local area network, a peer-to-peer wireless mesh, etc.). However, in other embodiments, the computing device 200 and the remote device 300 can communicate with each other in the absence of a network. Also, as used herein, the remote device 300 is "remote" in the sense that it is physically separate from the computing device 200 in some fashion. In many implementations, the physical distance is relatively great, such as when the remote device 300 is located in another town, state, or country. In other implementations, the physical distance may be relatively short, such as when the remote device 300 is in the same room or building as the computing device 200. Also, the term "remote device" can refer to a single remote device or multiple remote devices.

Other embodiments could be an online offline mode, i.e. offline sync or coordinating via clocks. Queueing may not necessarily be of computing resources but for access to content As shown in FIG. 1, in this embodiment, the controller 100 comprises one or more processors 102, a memory 104, and one or more user input devices (or elements) 106. The user input devices 106 can take any suitable form, such as, but not limited to, a button, a joystick, a switch, a knob, a touch-sensitive screen/pad, a microphone for audio input (e.g., to capture a voice command or sound), a camera for video input (e.g., to capture a hand or facial gesture), etc. To be clear, as used herein a "user input device" refers to a control surface and not to the entire system or parent device on which user input devices are placed.

Generally speaking, the controller 100 can be used by a user in the selection and (passive or active) consumption of content (e.g., playing a game, watching a video, listing to audio, reading text, navigating a displayed user interface, etc.) presented using the computing device 200 in some fashion. The controller 100 may be referred to based on the content with which it is being used. For example, the controller 100 can be referred to as a game controller when it is being used to play a game. And if the controller 100 is being used to play a game on a mobile device, such as a phone or tablet (as opposed to a relatively-stationary game console), the controller 100 can be referred to as a mobile game controller. However, the same controller 100 may also be used to control the playback of non-game content, such as video or audio. Accordingly, a specific use should not be read into the term "controller" unless expressly stated.

The computing device 200 can also take any suitable form, such as, but not limited to, a mobile device (e.g., a phone, tablet, laptop, watch, eyewear, headset, etc.) or a relatively more-stationary device (e.g., a desktop computer, a set-top box, a gaming console, etc.). In the embodiment shown in FIG. 1, the computing device 200 comprises one or more processors 202 and a memory 204. In this particular embodiment, the memory 204 stores computer-readable program code for an operating system (O/S) 210 (e.g., iOS or Android), native content 220, and an application configured for use with the controller 100 ("controller app") 240. This application 240 will sometimes be referred to herein as the client platform operating service or system. Exemplary functions of this application 240 will be described herein. Also, as used herein, "native content" refers to content that is at least partially stored in the computing device 200. For example, native content can be wholly stored on the computing device; or native content can be stored partially on the computing device 20 and partially on one or more remote devices 300 or some other device or set of devices.

The remote device 300 also comprises one or more processors 302 and memory units 304 storing remote content 320 and an application ("app") 340 (which is sometimes referred to herein as the remote platform operating service or system) that can be used to communicate with the controller app 240 or another entity on the computing device 200.

It should be understood that more or fewer components than what are shown in FIG. 1 can be used. For example, the computing device 200 can have one or more user input device(s) (e.g., a touchscreen, buttons, switches, etc.), as well as a display (e.g., integrated with a touchscreen). Further, while the components in the controller 100, computing device 200, and remote device 300 are all shown in respective single boxes in FIG. 1, implying integration in respective single devices, it should be understood that the components can be located in multiple devices. For example, the processor 302 and memory 304 in the remote device 300 can be distributed over multiple devices, such as when the processor 302 is a server and the memory 304 is a remote storage unit. As used, the remote device 300 can also refer to multiple remote devices that are in communication with the computing device 200. Other variations for any of the devices 100, 200, 300 are possible.

The memory 104, 204, 304 in these various devices 100, 200, 300 can take any suitable form and will sometimes be referred to herein as a non-transitory computer-readable storage medium. The memory can store computer-readable program code having program instructions that, when executed by one or more processors, cause the one or more processors to perform certain functions.

Figure 2:
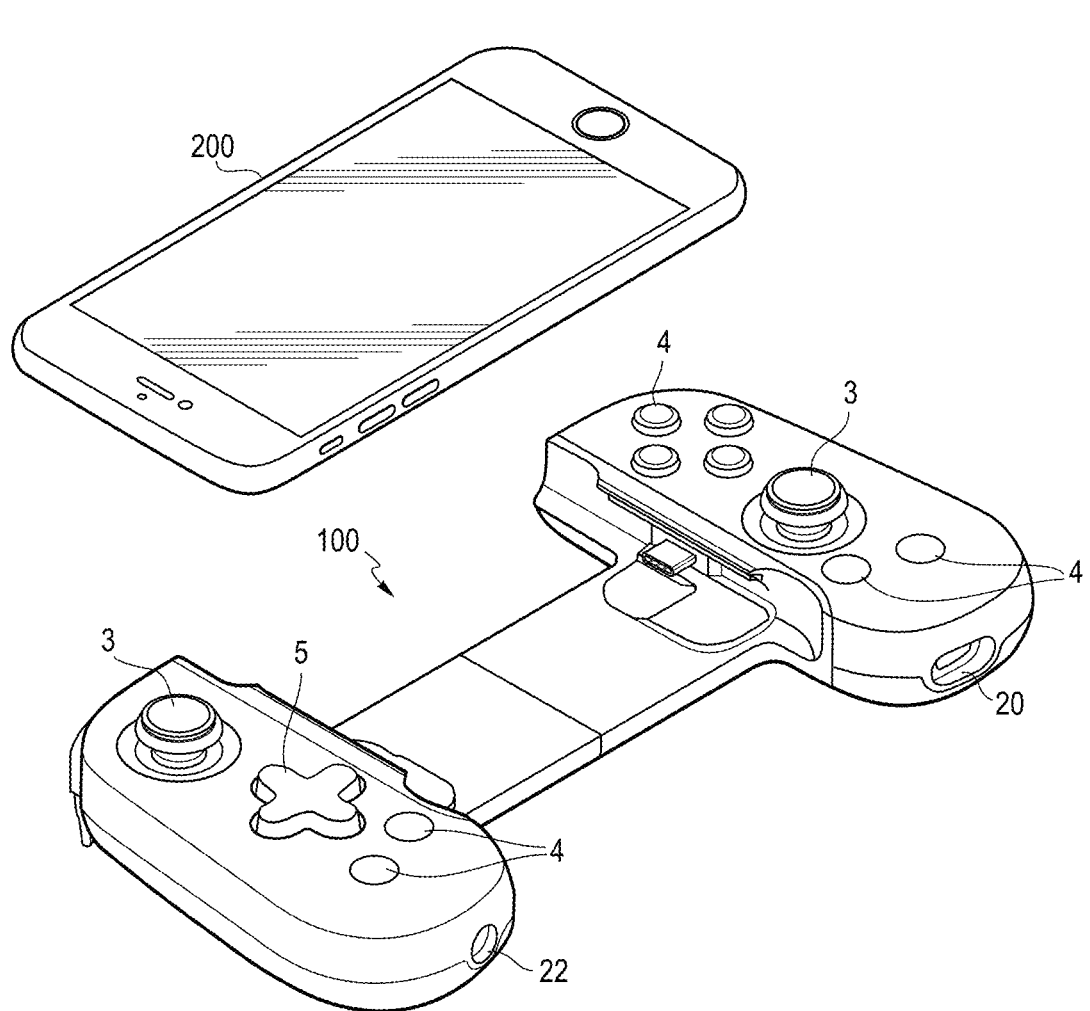
FIG. 2 is an illustration of an example controller and computing device of an embodiment.
Figure 3:
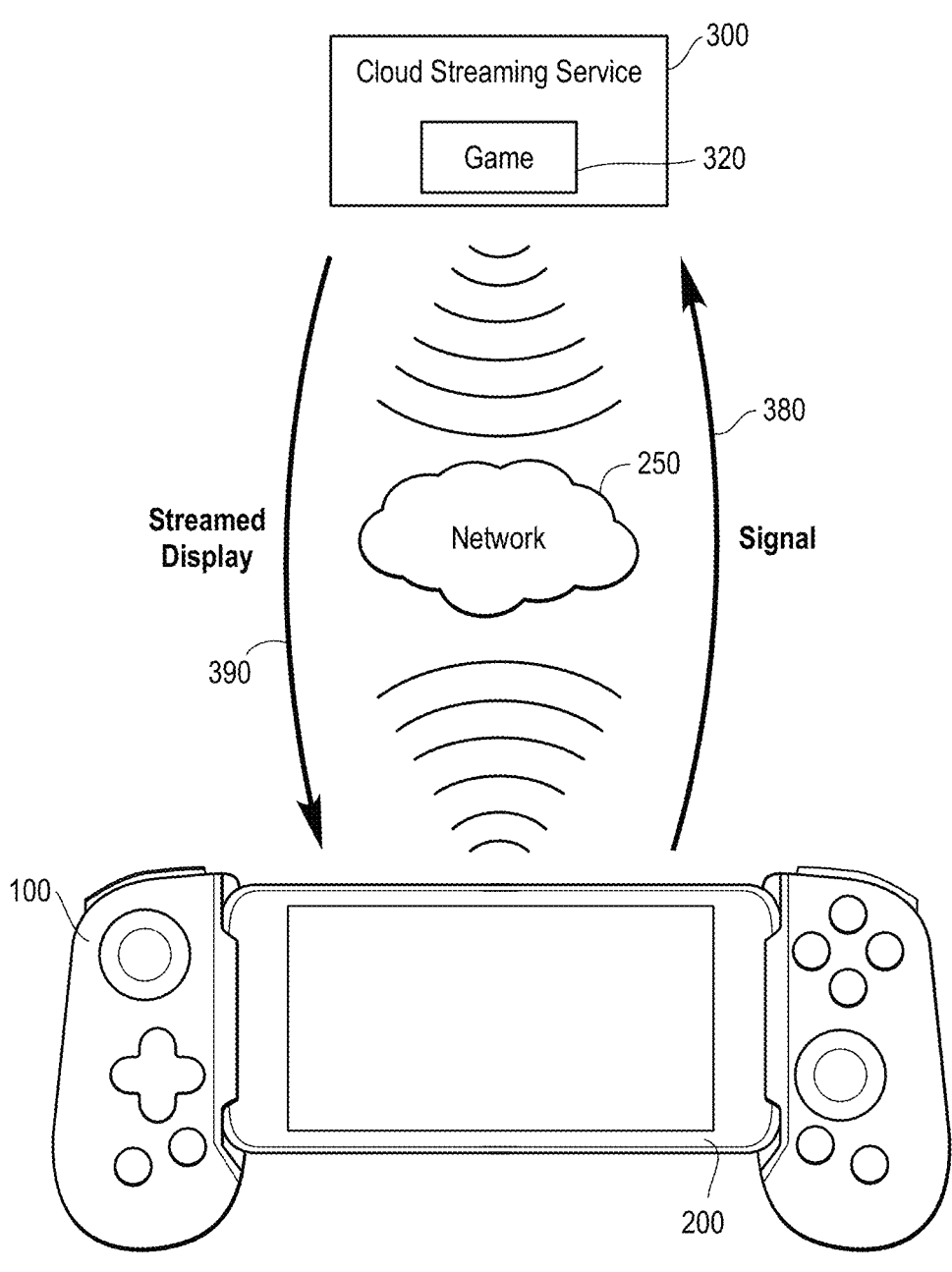
FIG. 3 is a diagram of an example computing environment of an embodiment.

As mentioned above, the controller 100, computing device 200, and remote device 300 can take any suitable form. For purposes of describing one particular implementation of an embodiment, the controller 100 in this example takes the form of a handheld game controller, the computing device 200 takes the form of a mobile phone or tablet, and the remote device 300 takes the form of a cloud gaming system. This example is shown in FIGS. 2 and 3. Again, this is just one example, and other implementations can be used. Further, as mentioned above, a game is just one example of content that can be consumed, and the controller 100 can be used with other types of content (e.g., video, audio, text). So, the details presented herein should not be read into the claims unless expressly recited therein.

Turning first to FIG. 2, FIG. 2 shows an example handheld game controller 100 and mobile phone 200 of an embodiment. This game controller 100 has a number of user input devices, such as joysticks 3, buttons 4, and toggle switches 5. In this example, the game controller 100 takes the form of a retractable device, which, when in an extended position, is able to accept the mobile phone 200. A male communication plug on the controller 100 mates with a female communication port on the computing device 200 to place the controller 100 and computing device 200 in communication with one another. The controller 100 in this embodiment also has a pass-through charging port 20 that allows the computing device 200 to have its battery charged and a headphone jack 22. In other embodiments, the controller 100 can connect to the computing device 200 through other means such as pairing wirelessly to the phone 200. Again, this is just an example, and other types of controllers can be used, such as those that do not fit around a mobile device.

As shown in FIG. 3, in this embodiment, the controller 100 can be used to play a game that is locally stored on the computing device 200 (a "native game" 220) or a game 320 that is playable via a network 250 on a cloud streaming service 300 (e.g., a cloud gaming service). In this example embodiment, remote gameplay, based on input from the game controller 100, the computing device 200 sends signals 380 to the cloud streaming service 300 and receives display data 390 back. In one embodiment, a browser on the computing device 200 is used to send and receive the signals 380, 390 to stream the game 320 to the user. There can be multiple variants of remote game play. One embodiment includes a host device, such a game console, PC, or other computing device not actively being controlled that can stream a game to the active computing device, such as a smartphone, from a host device (e.g., game console or PC) that a user can access remotely via their smartphone. Another embodiment includes a cloud streaming service (which can be streamed from a data center), such as Xbox Game Pass, Amazon Luna, or other service, that can be streamed to the active computing device.

Other embodiments could be a digital version of content that is physically owned by the user. This would allow users to stream or play a digital version of their content.

In one embodiment, the controller app 240 can facilitate the selection of a game (or other content). For example, the controller app 240 can display a user interface (e.g., on a display of the computing device 200 or on another display). The controller app 240 can also receive user input from the controller 100 to navigate and engage with content, for example, to browse for, select, and launch a game from a displayed list of games. In this example, once the game is launched, input from the game controller 100 can be provided directly to the game or indirectly to the game through the controller app 240. As will be discussed in more detail below, the controller app 240 can enhance the standard experience offered on a computing device by extending functionality and providing enhanced interface capabilities in addition to the inherent interface of the computing device itself. For example, in some embodiments, the controller app 240 assigns a function to one or more of the user input devices on the controller 100 based on the particular content being consumed.

Figure 4:
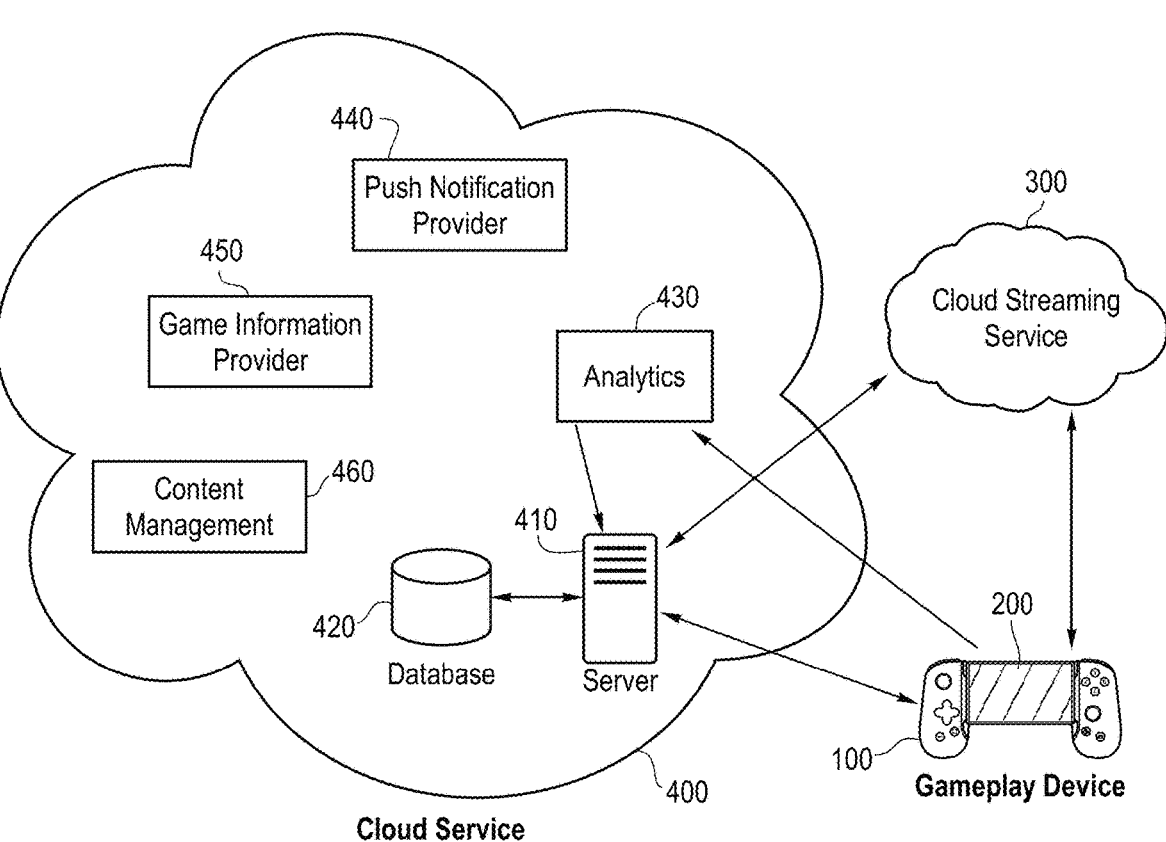
FIG. 4 is a diagram of an example network of an embodiment.

As shown in FIG. 4, in addition to being in communication with the remote device/cloud streaming service 300, the gameplay device (i.e., the controller 100 and the computing device 200) can be in communication with a cloud service 400. In one embodiment, data is not publishing to the cloud service 300, but data is consumed from it (i.e., there may or may not be the bidirectional communication). The combination of the functionality provided by the controller app 240 on the computing device 200 and the functionality provided by the cloud service 400 will sometimes be referred to herein as a "platform operating service." In one embodiment, the functionality of the cloud service 400 can be provided by the same or related entity that provides the controller 240 (e.g., the manufacturer of the controller 100 or an entity related to the manufacturer of the controller 100). Other arrangements are possible. The functionality can be used to facilitate operation of the controller 100 and its use to select and consume content (e.g., play a game) from the cloud streaming service 300.

The cloud service 400 can comprise any suitable component or functionality. In the example shown in FIG. 4, the cloud service 400 comprises a server 410, a database 420, an analytics element 430, a push notification provider 440, a game information provider 450, and a content management element 460. The server 410 can comprise one or more processors and a non-transitory medium that stores program instructions that, when executed by the one or more processors, provide various functions, some of which are described below. The server 410 or other component of the cloud service 400 can contain a memory that stores additional program instructions that can be sent to the computing device 200, which will also be described below.

Additional details and features, at least some of which can be used with these embodiments, can found in U.S. provisional patent application No. 63/422,797, filed Nov. 4, 2022, which is hereby incorporated by reference.

Examples of Cloud Game Queuing

Figure 5:
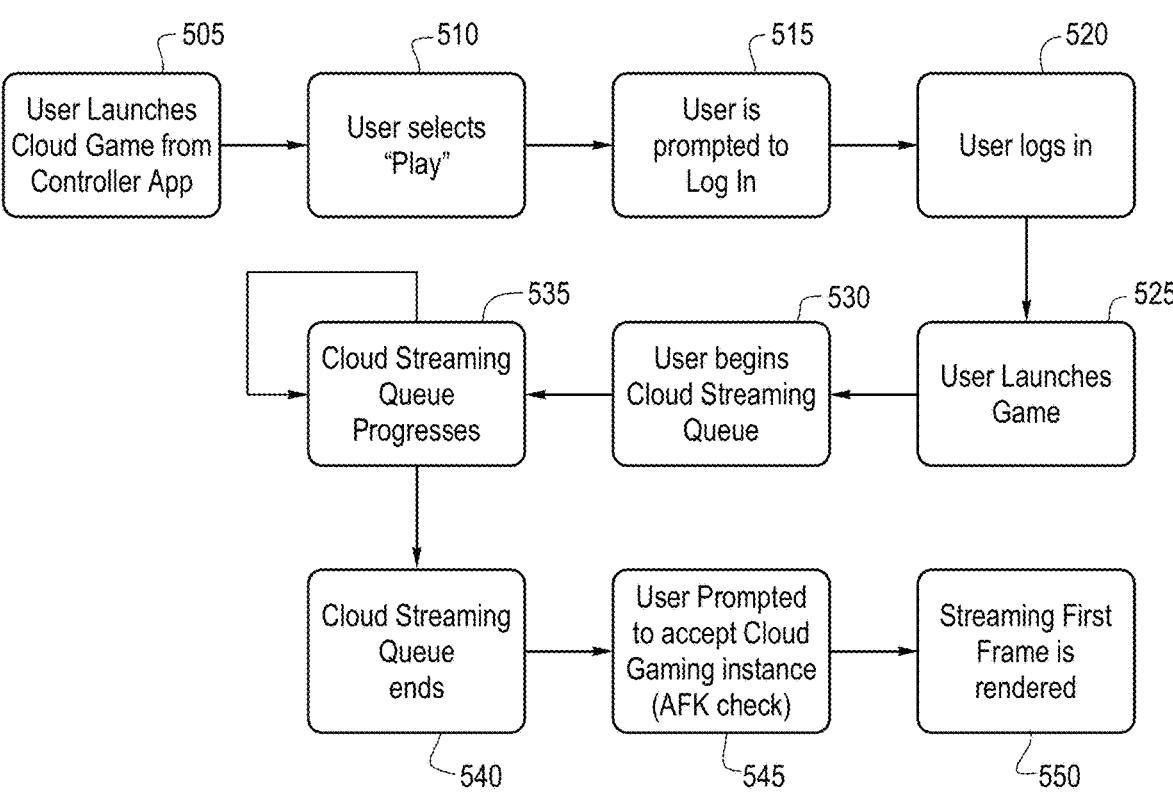
FIG. 5 is a flow chart of an example cloud game queuing method of an embodiment.

As mentioned above, in some situations, the gameplay device (e.g., the mobile game controller 100 and the computing device 200) is used to select and play a game from the cloud streaming service 300. FIG. 5 is a flow chart that illustrates this process. As shown in FIG. 5, the user starts by launching the cloud game from the controller app 240 on the computing device 100 (act 505) and selecting "play" (act 510). This can cause a browser to launch in the controller app 240, and a user interface element such as but not limited to a web page from the cloud streaming service 300 is displayed in the browser and prompts the user to log-in (act 515). After the user logs-in (act 520), the game may start, with the streaming game content being provided in the browser launched inside of the controller app 240. However, in other situations, there may be a wait to play the game. For example, the cloud streaming service 300 may limit the number of users who can play the game at any given time based on the computing resources that are allocated for the game. Without such a limitation, there may be unintended delays or pauses in the game that can adversely affect the user's game play experience.

In other embodiments, the content can be launched via Bluetooth streaming or other media streaming methods.

Figure 6:
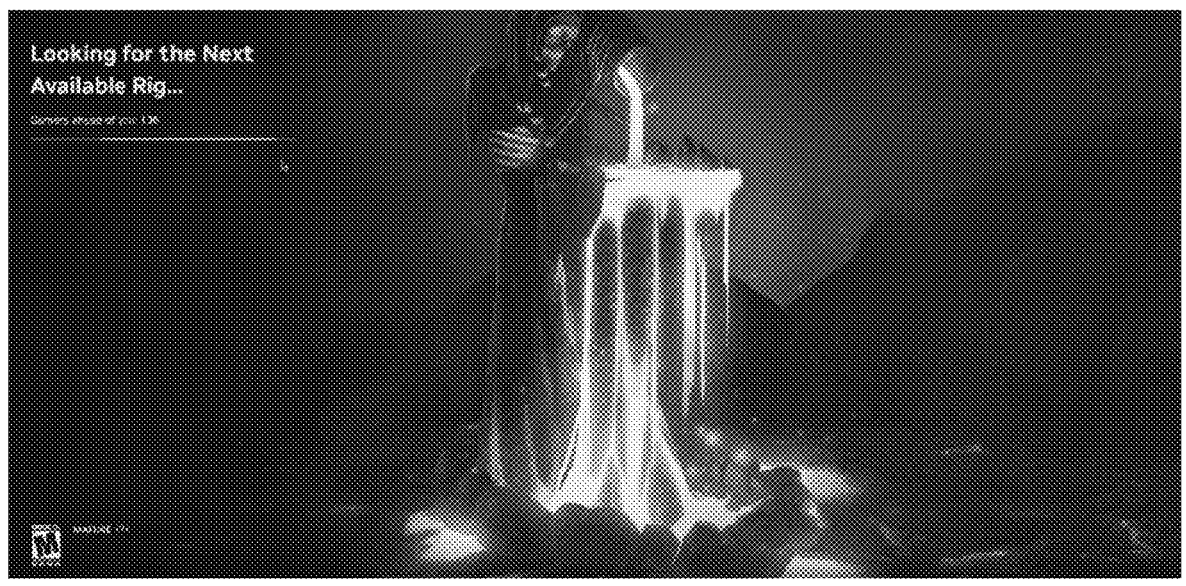
FIG. 6 is a screen shot of an embodiment that provides an indication of a user's place in a queue.
Figure 7:
FIG. 7 is a screen shot of an embodiment that provides an updated indication of a user's place in a queue.
Figure 8:
FIG. 8 is a screen shot of an embodiment that informs a user that the user progressed out of a queue.

So, if the selected cloud game does not have the capacity to allow the user to play the game, the user is entered into a queue (act 530). The web page displayed in the browser can provide the user with an indication of the user's place in the queue (see FIG. 6) or a schedule time to access the content. This indication can take any suitable form, such as, but not limited to, a number that indicates the user's position in the queue (e.g., "you are the $10^{th}$ person in the queue) or an estimated amount of time before the user can play the game (e.g., "your wait time is approximates 10 minutes), etc. As the user moves up in the queue (e.g., as players leave the queue to enter the game or exit the queue by closing their browser) (act 535), the cloud streaming service 300 can provide an updated web page that shows the user's updated position in the queue (see FIG. 7). When the user progresses out of the queue (act 540), the user can be prompted to satisfy an "away from keyboard (AFK)" check to being playing the game (act 545) (see FIG. 8). This is done because it is possible that, due to the wait to play the game, the user may place their gameplay device down to do something else and may not be near their gameplay device when they are eventually allowed to play the game. The AFK check ensures that the user is actually there to play the game, thereby avoiding the possibility of allowing an "idle player" to take up a space that could have otherwise been offered to another user in the queue. After the user satisfies the AFK check, the browser in the controller app 240 displays the first frame streamed from the cloud streaming service 400, and the user begins to play the game (act 550).

There are headwinds that suggest queue times will be the norm for cloud gaming services. As cloud gaming becomes more developed and adopted, demand will require these services to make users wait to play if they do not pay a premium to avoid queueing or to advance in the queue. For example, one cloud streaming service (GeForce Now) already has queue times for its free tier where a user might need to wait over an hour to play, and another cloud streaming service (Xbox Cloud Gaming) turned on its queue time system during a prior Christmas season.

Cloud game queuing can be a negative experience for a user, especially when wait times are unknown and highly unpredictable. Also, a user may not feel a sense of security that they can do other activities inside or outside of the controller app 240 without disconnecting their cloud gaming session, especially if there is not a clear and easy way to minimize and exit the game while waiting in a queue. To address this problem, in one embodiment, when a user is waiting in a cloud gaming queue, the user can press a button (or, more generally, activate a user input element) on the game controller 100 to allow the user to keep their place in the cloud game queue while allowing the user to perform other activities ("multi-task") on the gameplay device (e.g., play another game, user another application on the computing device 200, etc.). While performing another activity, the computing device 200 can display an indication of the user's status in the queue (e.g., the user's position in the queue, an estimated amount of time before the user can play the game, etc.). The display of this indication can be dynamic to reflect the user's progress in the queue.

This indication can take any suitable form. For example, the computing device can minimize the display of the browser communicating with the cloud streaming service 400 (e.g., by placing the browser in the smaller display area of a picture-in-picture display). This way, the user can perform another activity in the larger display area while still being able to see the browser for the cloud streaming service 400 in the smaller display area. That can give the user assurance that they are still in the queue and can also provide information to the user about the wait to play the game.

More information about picture-in-picture and alternatives, which can be used alone or in combination with the embodiments presented herein, can be found in U.S. patent application Ser. No. 18/076,172, filed Dec. 6, 2022, which is hereby incorporated by reference.

In some situations, it may be difficult for the user to read the queue status information from this smaller version of the browser. Also, while relatively small, the smaller version of the browser still takes up real estate on the display, which can interfere with the user's view of the rest of the display. This is especially true if the user is waiting in more than one queue. So, in another embodiment, the browser (or, more generally, the display area) can be minimized or otherwise not displayed to the user while still keeping the browser running in the background (e.g., in response pushing a button or otherwise activating a user input element on the controller 100), so the user's place in the queue is not lost. Even though the browser is not displayed, information about the user's wait in the queue can be displayed (e.g., using a pop-up notification, a persistent indicator, a dynamic island, a live-activities display, etc.). As used herein, the phrase "the user's wait in the queue" can refer to the user's position in the queue, an estimated time remaining in the queue, and/or other information, such as, but not limited to, historical wait times, other users' wait times, what other users are in line, etc.

The information about the user's wait can be obtained in any suitable way. For example, the computing device 200 can use an application program interface (API) to communicate with the cloud streaming service 300 to ask for and obtain the information. As another example, the computing device 200 can use an algorithm to estimate the information based on other information. For instance, the computing device 200 can observe a rate of progress in the queue and use that as the basis for the estimate (e.g., the user moved from position 500 to position 490 in the queue in one minute, so the user's estimated wait time is 50 minutes).

As another example, the information about the user's wait in the queue can be scraped from a web page that is received from the cloud streaming service 300 (the web page may not be displayed to the user if the browser is not in the foreground and displayed to the user). In one embodiment, special program instructions (e.g., JavaScript code) are received from the server 410 in the cloud service 400 to enable the computing device 200 to do the scraping. A memory in the server 410 or elsewhere in the cloud service 400 can store a plurality of sets of program instructions for a variety of games, and the server 410 can choose which set to send to the computing device 200 (e.g., as a single payload or as part of an event-based payload) based on an identification of the game that was launched on the cloud streaming service 300. Also, as the cloud streaming service 300 may change the display location of the queue information, the server 410 can dynamically update (on-the-fly) the program instructions to account for the change and send updated program instructions to the computing device 200. When the user eventually progresses out of the queue, the computing device 200 can re-display the browser or display area (e.g., automatically or after prompting the user for confirmation) to allow the user to play the game.

The flow charts of FIGS. 9-11 and the screen shots of FIGS. 12-32B will now be described to provide an illustration of one example implementation of these embodiments. It should be understood that this is merely an example and that other implementations can be used. As such, none of the details presented herein should be read into the claims unless expressly recited therein.

Figure 9:
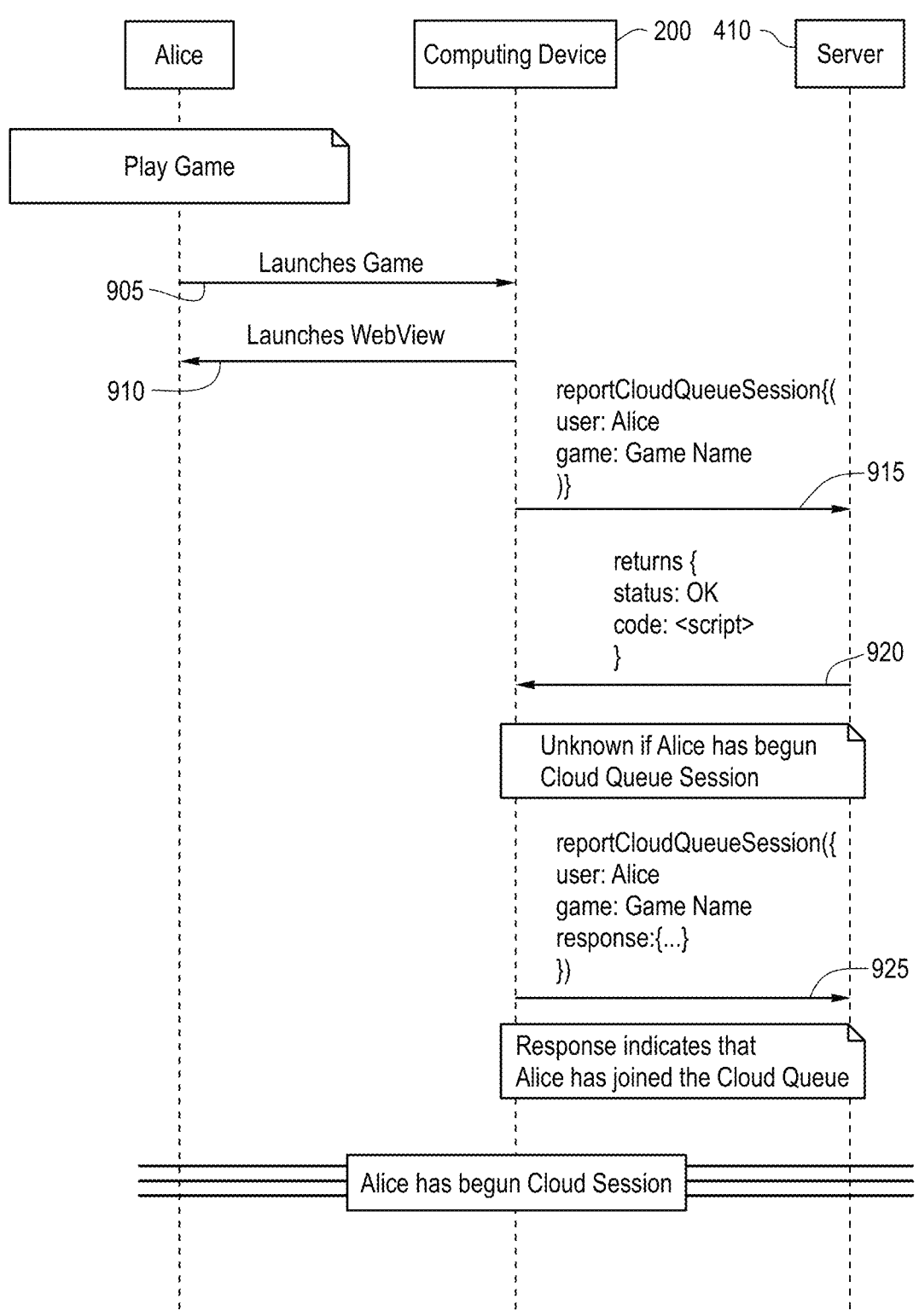
FIG. 9 is a user queue flow diagram of an embodiment.

Turning first to FIG. 9, FIG. 9 is a flow diagram illustrating the beginning of the queue flow process. In this example, the user (Alice) wants to use the computing device 200 to play a game on the cloud streaming service 300 (not shown in FIG. 9 to simplify the drawing) using the game controller 100. When the user launches the game (act 905), a browser is launched and displays a webpage to the user (act 910), and the computing device 200 informs the server 410 that the user launched the game (act 915). With this information, the server 410 selects the appropriate program instructions that the computing device 200 may need to scrape the information about the user's wait in the queue from a web page received from the cloud gaming streaming 300 and sends the program instructions to the computing device 200 (act 920). In this example, the program instructions are sent even before the user enters the queue (in other examples, the program instructions can be sent after the user enters the queue). After the user enters the queue, the computing device 200 informs the server 410 (act 925).

Figure 10:
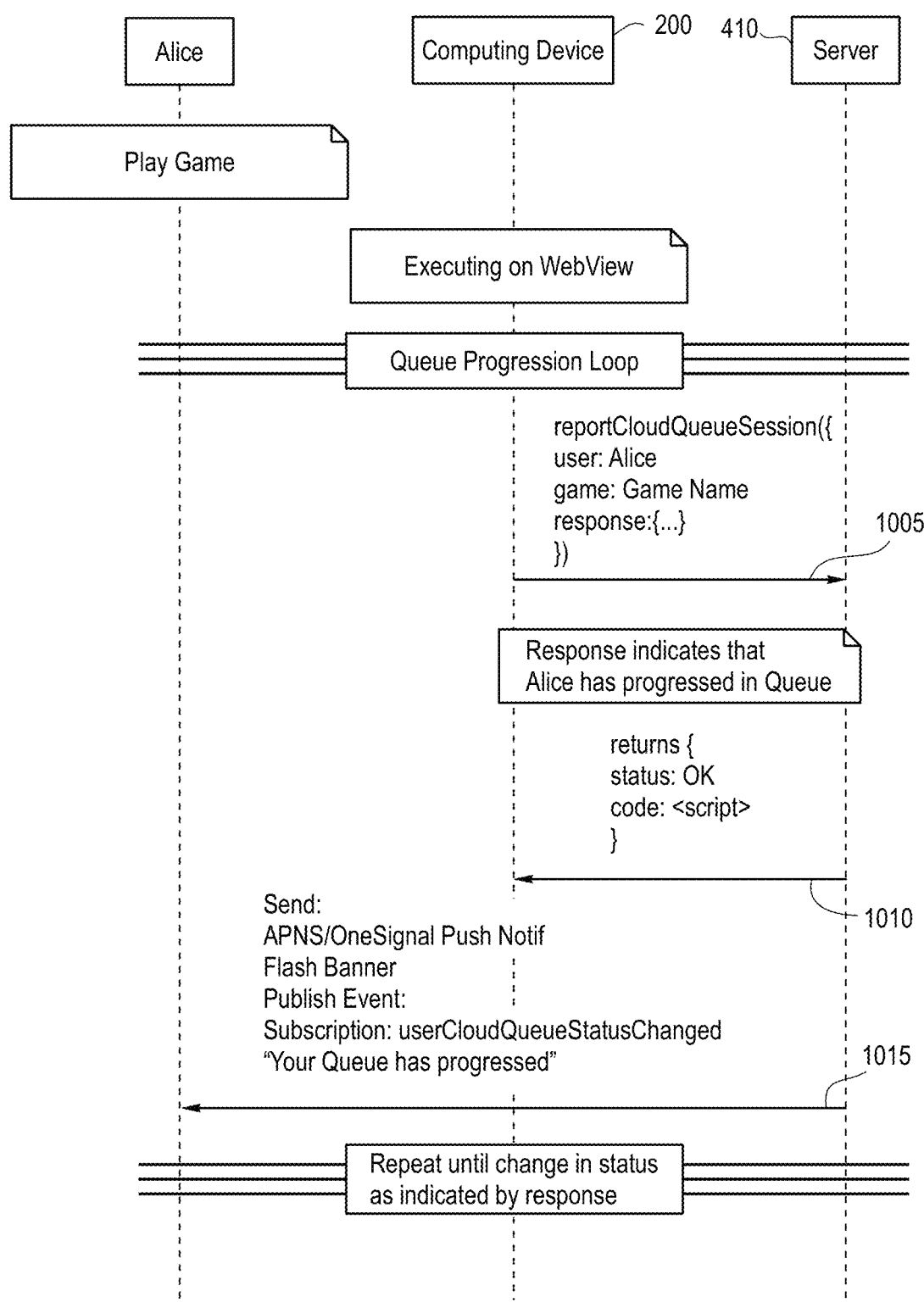
FIG. 10 is a flow diagram of an embodiment for user queue progression.
Figure 11:
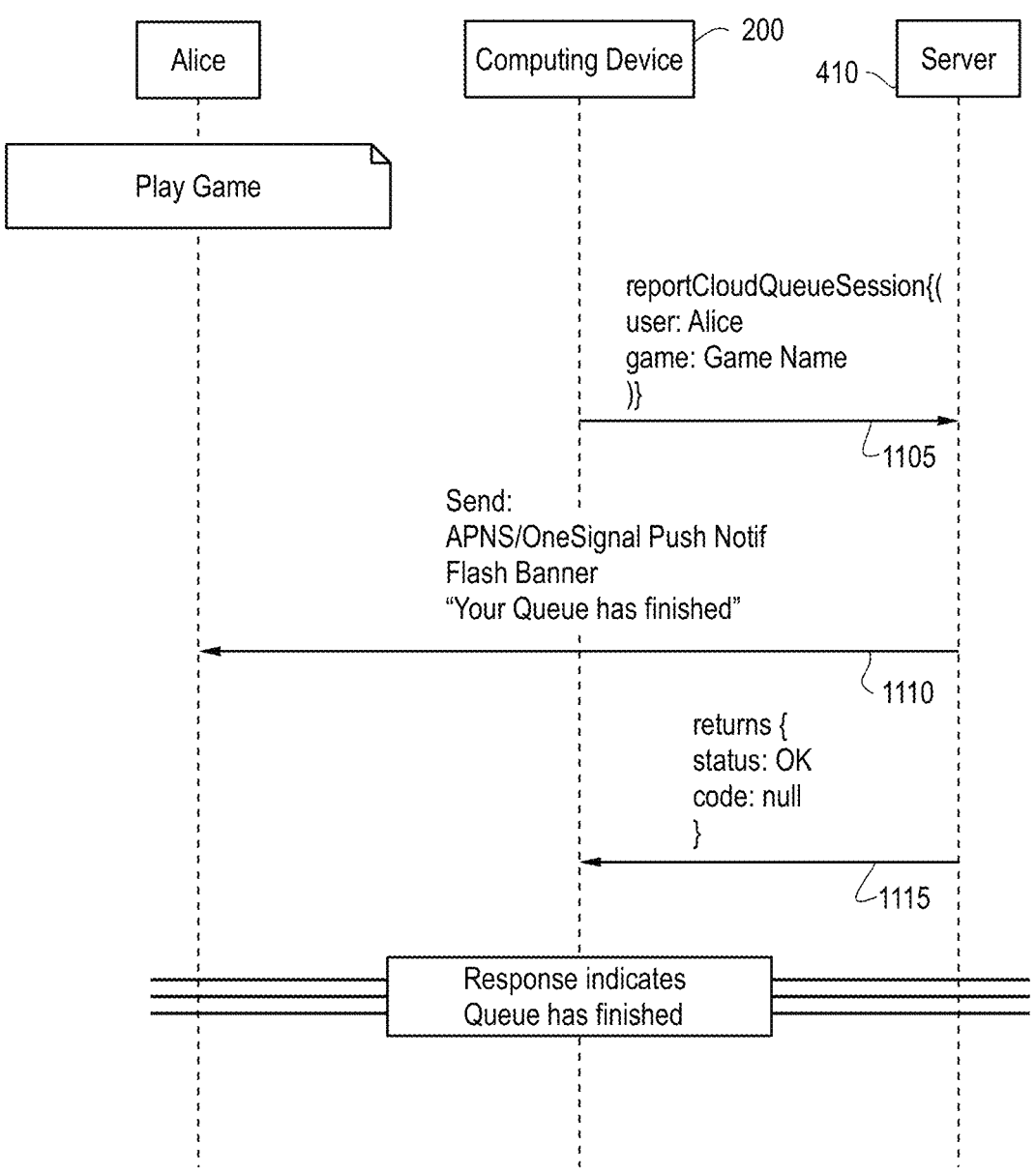
FIG. 11 is a flow diagram of an embodiment for user queue completion.

As shown in FIG. 10, in this example, as the computing device 200 determines that the user is making progress in the queue (e.g., using the program instructions previously received from the server 410), the computing device 100 informs the server 410 of the progress. In this example, the server 410 sends potentially-updated program instructions to scrape the information about the user's wait in the queue from a web page received from the cloud streaming service 300 (act 1005). This is done in case the cloud streaming service 300 changes where the queue information is displayed, which may render the previously-sent instructions out-of-date. The server 410 also informs the user, via the computing device 200, of the information about the user's wait in the queue (act 1015). As shown in FIG. 11, this continues (e.g., with the computing device 200 pinging the cloud streaming service 300 for new web pages to scrape) until the computing device 200 informs the server 410 that the user has progressed out of the queue (act 1105). At that time, the server 410 informs the user, via the computing device 200, that the queue has finished (act 1110) and sends a completion message to the computing device 200 (act 1115).

It should be noted that while the above example was described in terms of the user entering one game/platforms's queue, these embodiments can be used when the user is in multiple queues. In that situation, the user's progress in all the queues can be displayed individually or in a combined fashion.

Turning now to the screen shots of FIGS. 12-32B, these screenshots illustrate a possible flow of one implementation of these embodiments. As mentioned above, it should be understood that this is merely an example and that other implementations can be used. As such, none of the details presented herein should be read into the claims unless expressly recited therein.

Figure 12:
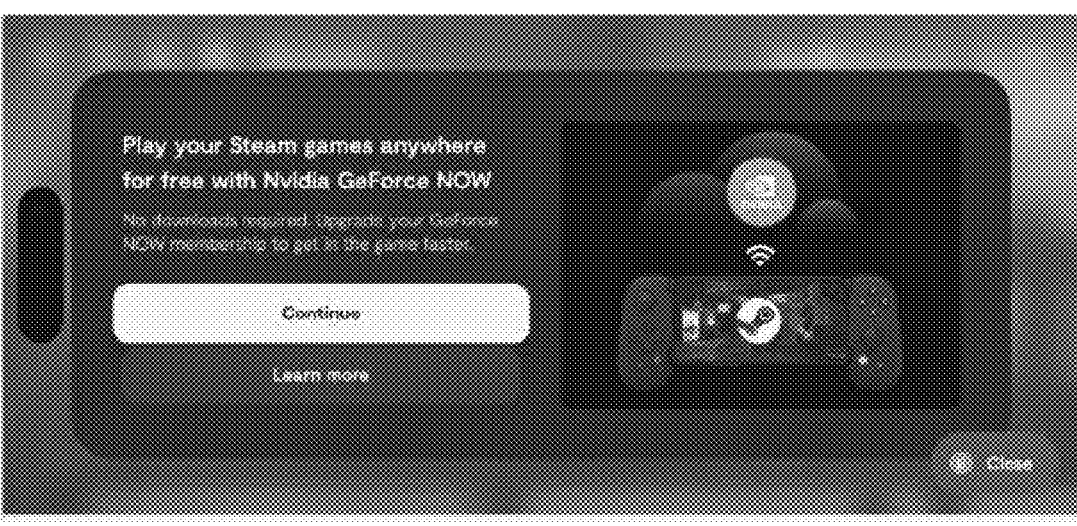
FIG. 12 is a screen shot of an embodiment that provides launch education.
Figure 13:
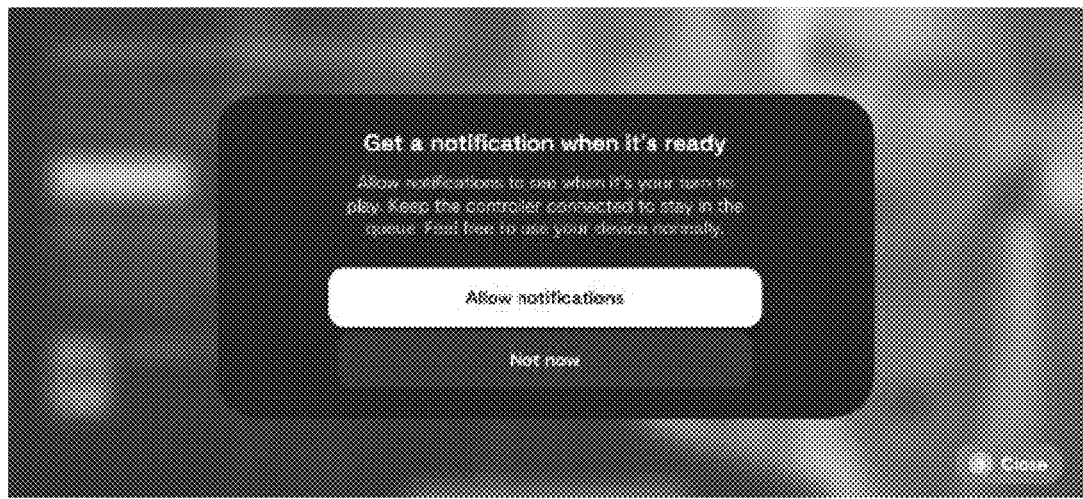
FIG. 13 is a screen shot of an embodiment that prompts a user to enable notifications.
Figure 14:
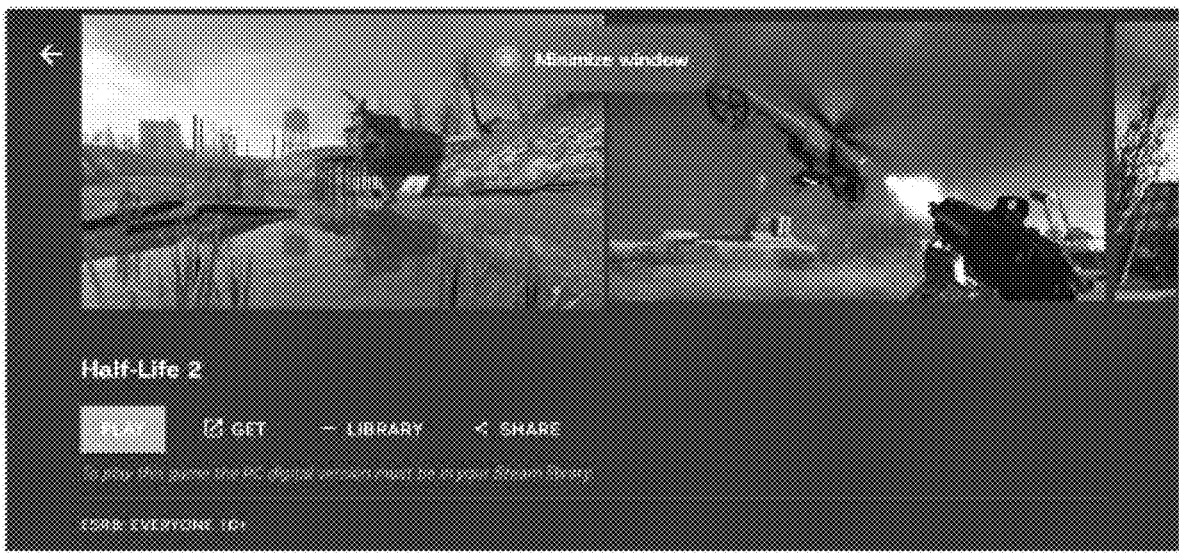
FIG. 14 is a screen shot of an embodiment that notifies a user that a game window can be minimized.
Figure 15:
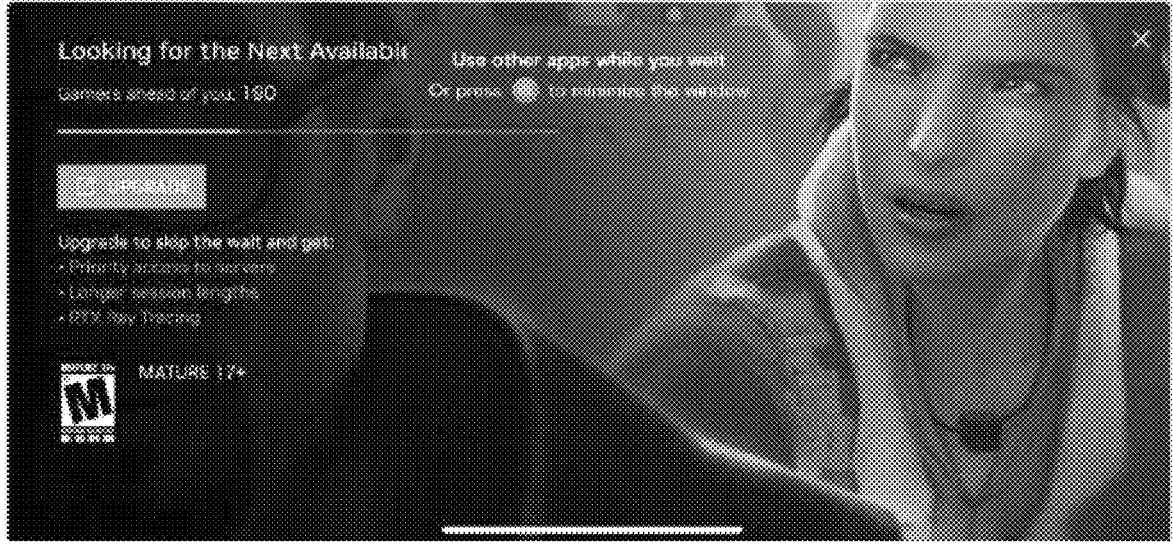
FIG. 15 is a screen shot of an embodiment that notifies a user that the user can use other applications while the user is waiting in a queue.
Figure 16:
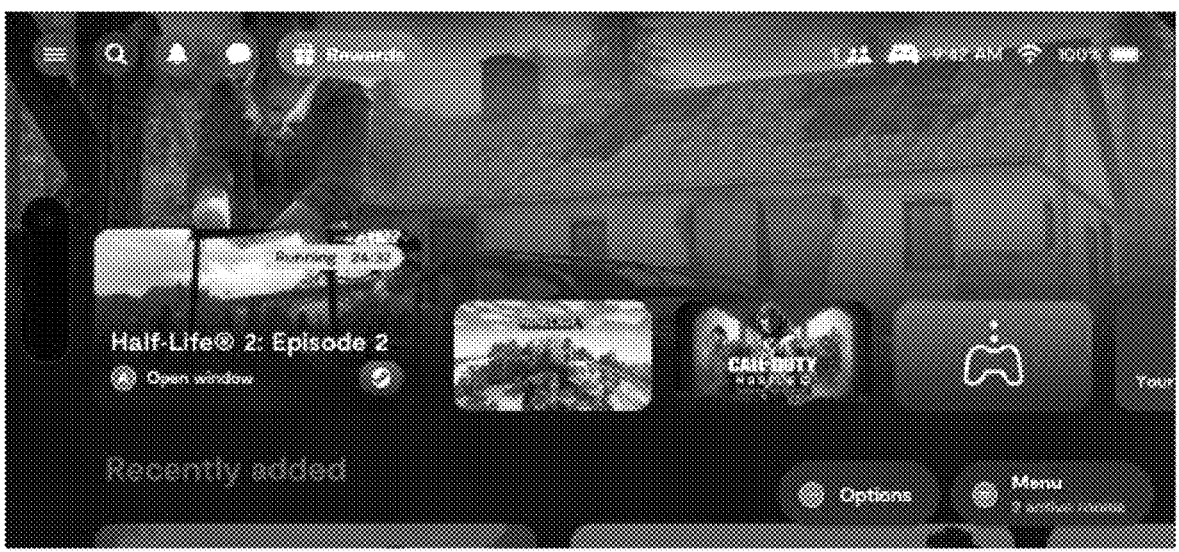
FIG. 16 is a screen shot of an embodiment that displays a game tile showing a last state of a game.
Figure 17:
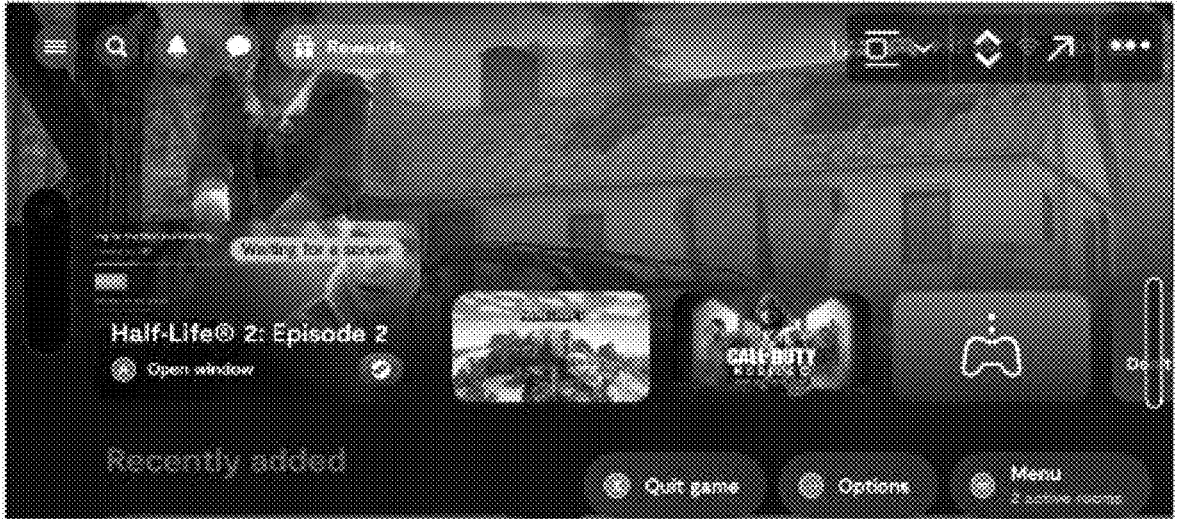
FIG. 17 is a screen shot of an embodiment that notifies a user that there is a wait for a server.
Figure 18:
FIG. 18 is a screen shot of an embodiment that shows how long a rig has been running.

Starting with FIG. 12, the first time a user launches a game, an "education modal" screen can be displayed that informs a user of an upgrade option to expedite or avoid queuing. Next (FIG. 13), the user is asked to turn on notifications, as notifications are used in this example to present information about the user's wait in the queue. Then (FIG. 14), the user is presented with the option to play a selected game and is also informed of the option to minimize the window by pushing a button on the game controller 100. After the user launches the game, a web page is received from the cloud streaming service 300 and displayed to the user showing the user's position in the queue (FIG. 15). This screen also displays an in-app notification letting the user know that they can multitask (e.g., "Use other apps while you wait"). At this point, if the user backs out of an active cloud stream game, the user is brought back to an integrated dashboard display, where the displayed tile for the game in the dashboard is a screenshot of the last state the user saw before backing out (FIG. 16). If the user backs out while in the queue, the screen can also display the state (e.g., "waiting for a server") (FIG. 17). If the user backs out while in an active stream, the screen can show how long the rig has been running (FIG. 18). If showing the time is not possible, the screen can just display the text "Running." Also, the user can be prevented from being kicked out of their current cloud gaming session due to membership restrictions on session length.

Figure 19:
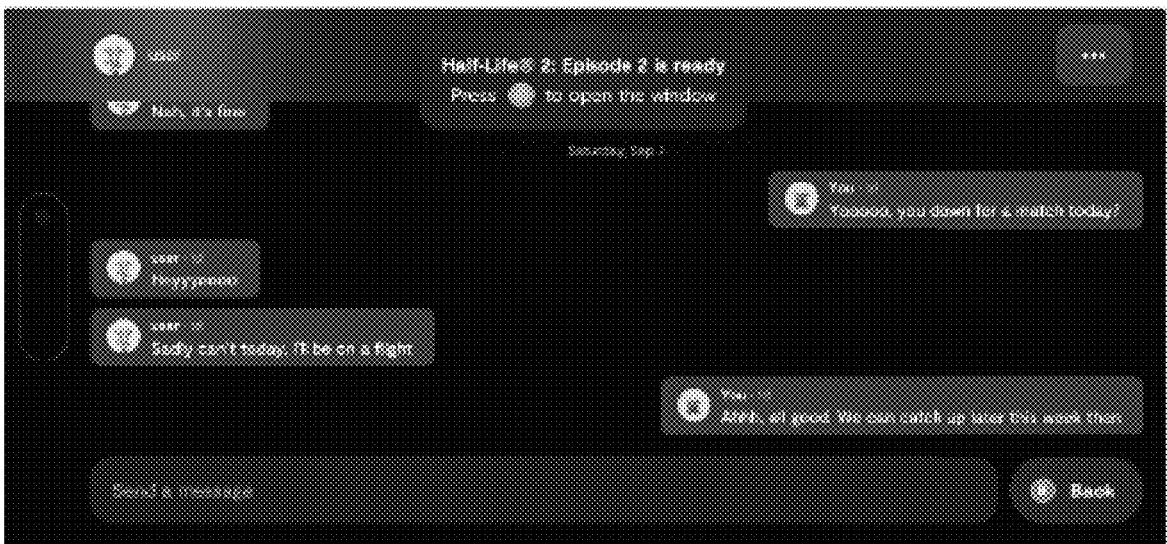
FIG. 19 is a screen shot of an embodiment that notifies a user that the user has progressed out of a queue.

As shown in FIG. 19, if the user moves off of an active cloud stream game tile, a persistent game indicator can appear at the top of the screen. This indicator can stay pinned to the top of the screen until the user opens the web view, and the indicator can disappear if the user scrolls back to the active cloud game. Color coding can also be used (e.g., display an orange indicator when the game is queuing, and display a green indicator when the rig is active). Pressing a button on the game controller 100 can animate the active cloud stream game back to the foreground. If the last game was not the active cloud stream game (e.g., if the last game was a native game stored in the computing device 200), pressing the button on the game controller 100 can go back to the native game. Also, tapping the persistent indicator can animate the active cloud stream game back to the foreground.

Figure 20:
FIG. 20 is a screen shot of an embodiment that notifies a user that a game is still running.
Figure 21:
FIG. 21 is a screen shot of an embodiment that notifies a user that the user can only play one game at a time.
Figure 22:
FIG. 22 is a screen shot of an embodiment that present a user with an option to quit a game.
Figure 23:
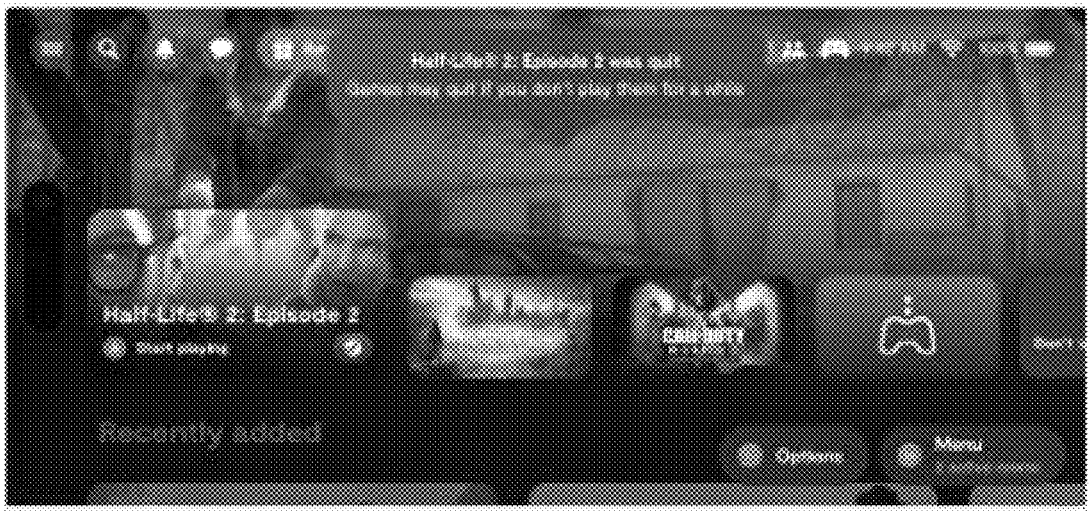
FIG. 23 is a screen shot of an embodiment that notifies a user that the game has quit.
Figure 24:
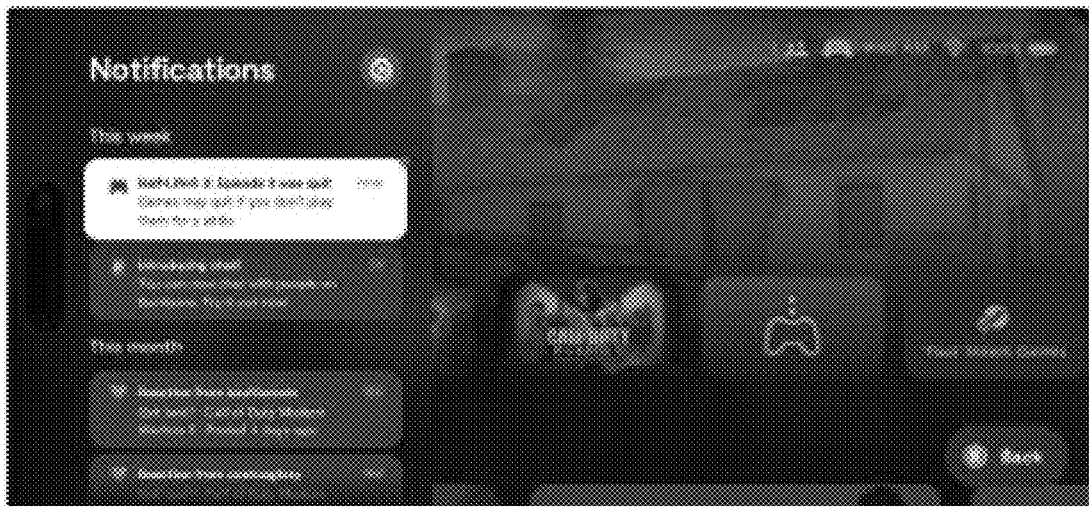
FIG. 24 is a screen shot of an embodiment that displays a set of notifications.
Figure 25:
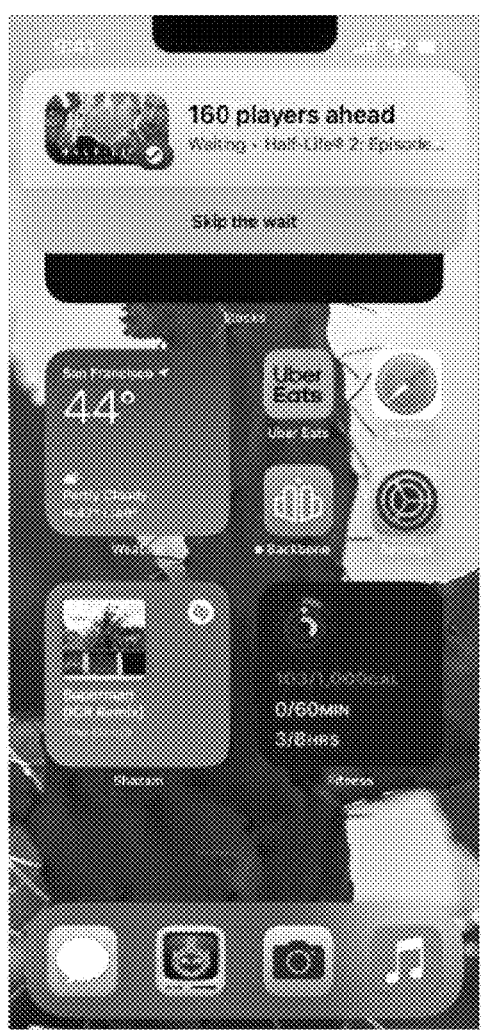
FIG. 25 is a screen shot of an embodiment that notifies a user of the user's position in a queue.

As shown in FIG. 20, if the user switches to a native game or other content on the device while playing an active cloud stream (not in queue), they can receive an in-app notification that their game is still running. Additionally, as shown in FIG. 21, if the user tries to switch to another cloud game, a screen can appear to warn the user that they can only have one active stream at a time, if there is such a restriction. Further, as shown in FIG. 22, the user can be able to quit an active cloud game stream while they are queuing or in an active rig. Also, as shown in FIGS. 23 and 24, if the user's active game rig quits based on inactivity, they can receive an in-app notification and a notification center message that their game quit.

Figure 26:
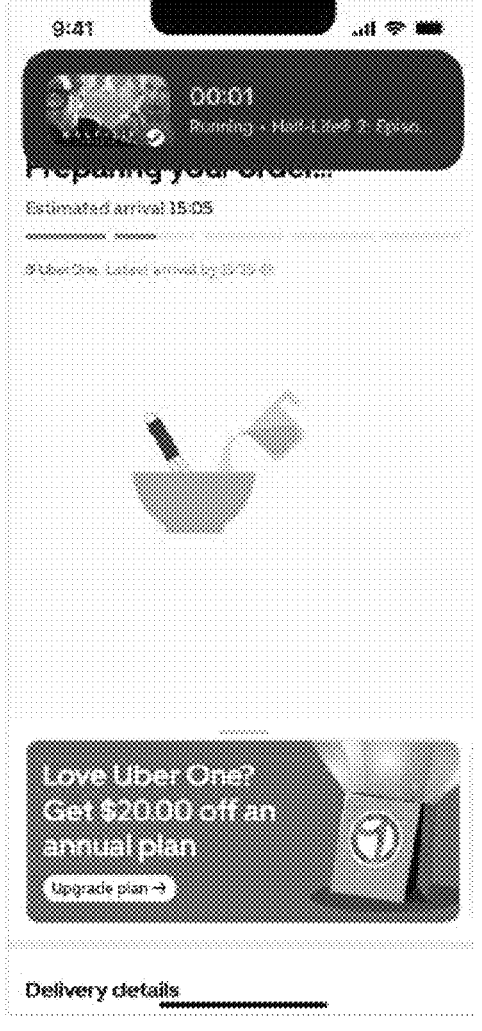
FIG. 26 is a screen shot of an embodiment that notifies a user of how long a game was running.
Figure 27:
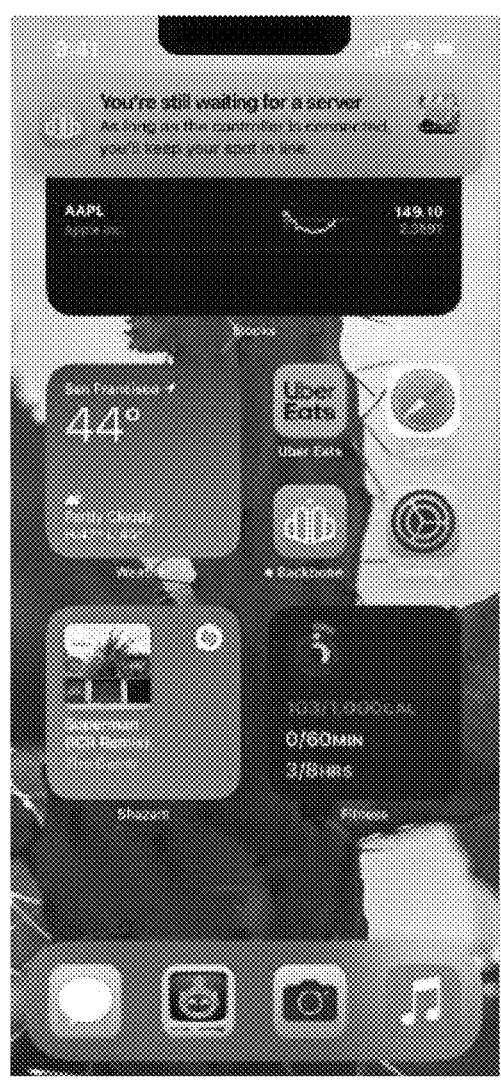
FIG. 27 is a screen shot of an embodiment that notifies a user of a wait for a server.
Figure 28:
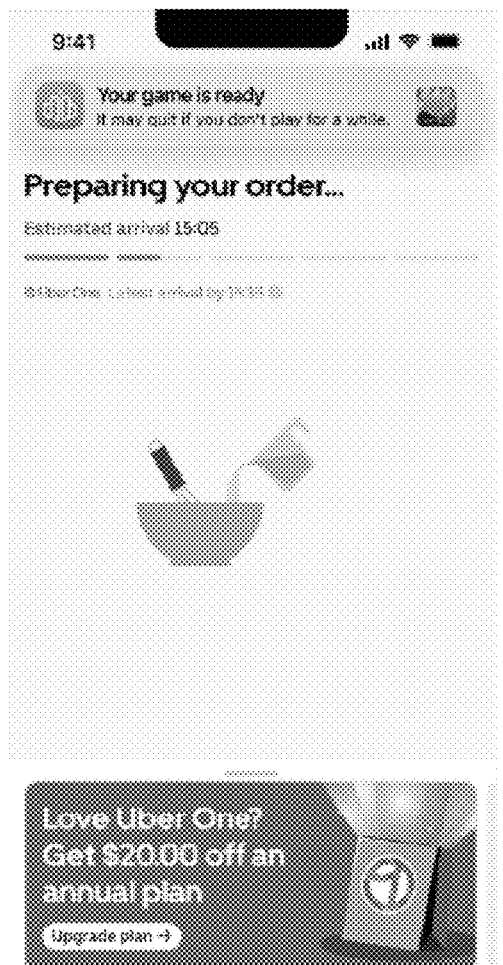
FIG. 28 is a screen shot of an embodiment that notifies a user that a game is ready.
Figure 29:
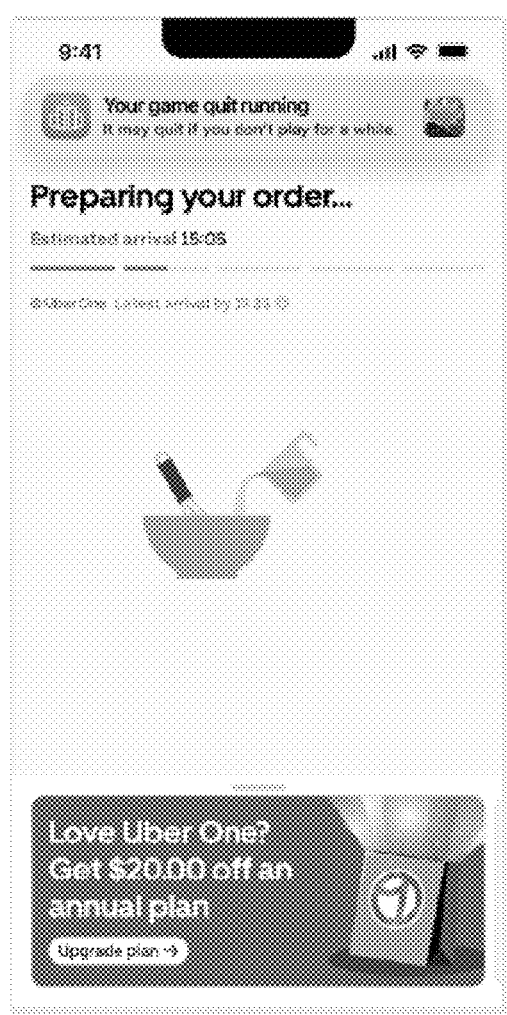
FIG. 29 is a screen shot of an embodiment that notifies a user that a game has quit running.
Figure 30:
FIG. 30 is a screen shot of an embodiment that notifies a user that a game has quit running.

As mentioned above, information about a user's wait in the queue can be displayed in any suitable manner. In the example shown in FIG. 25, the information is displayed in a live activity notification. So, if the user minimizes their cloud gaming browser while in a cloud gaming queue, the computing device 200 can display a live activity notification with how many users are ahead of them in line. Also, as shown in FIG. 26, if the user minimizes their cloud gaming browser while in a cloud gaming session, the computing device 200 can display a live activity notification with how long the rig has been running. Additionally, as shown in FIG. 27, if the user backgrounds the controller app 240 while in a cloud game queue, they can receive a push notification that the queue is in progress and that they will keep their spot in line. When the user is in multiple queues, only one of these notifications can be sent per queue, so the user would not receive another notification unless they started queueing for another game. Once the user's active cloud stream game queue is ready, they can receive a push notification that their game is ready (see FIG. 28). If the user's active game rig quit based on inactivity, they can receive a push notification (see FIG. 29). Also, if the user's active game rig quit because the game closed due to the controller 100 not being connected, they can receive a push notification (see FIG. 30).

Figure 31:
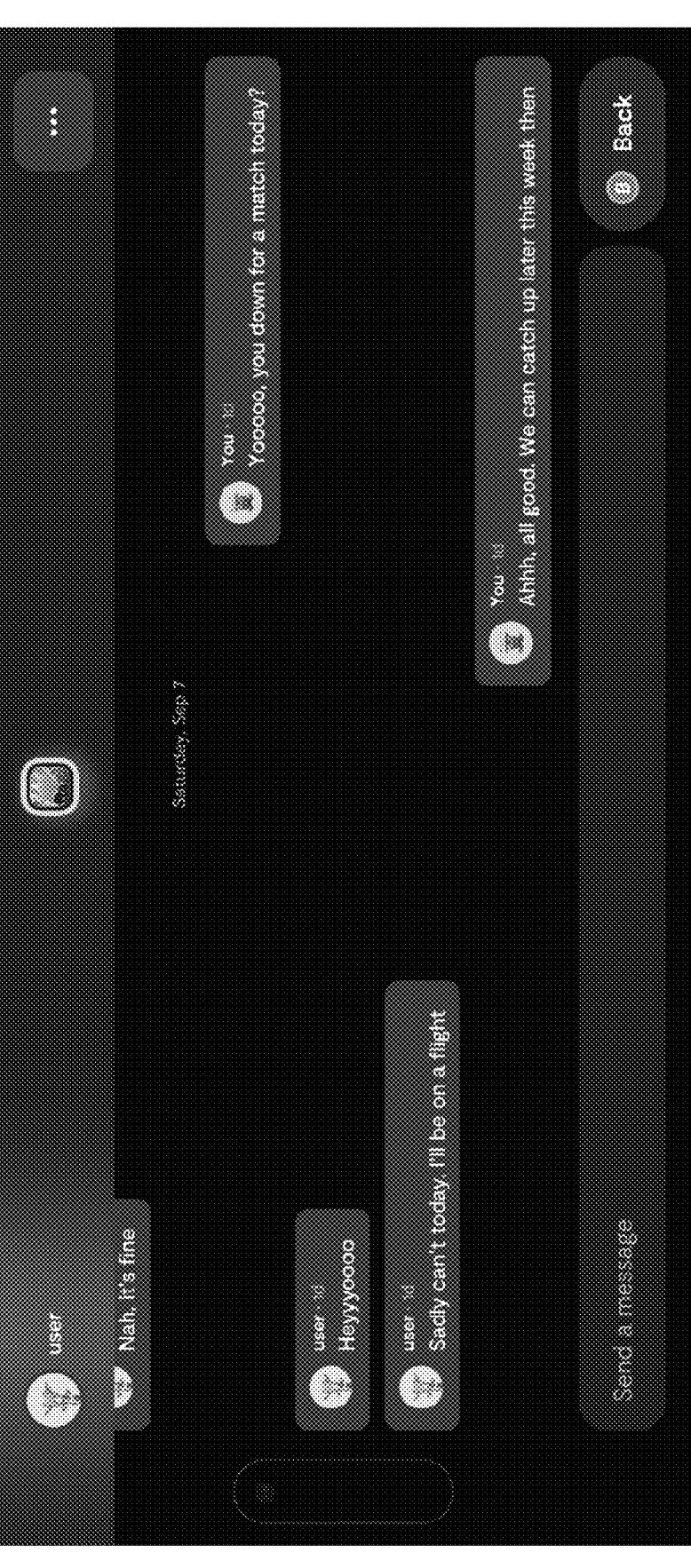
FIG. 31 is a screen shot of an embodiment that shows surfacing of a game icon.
Figures 32A, 32B:
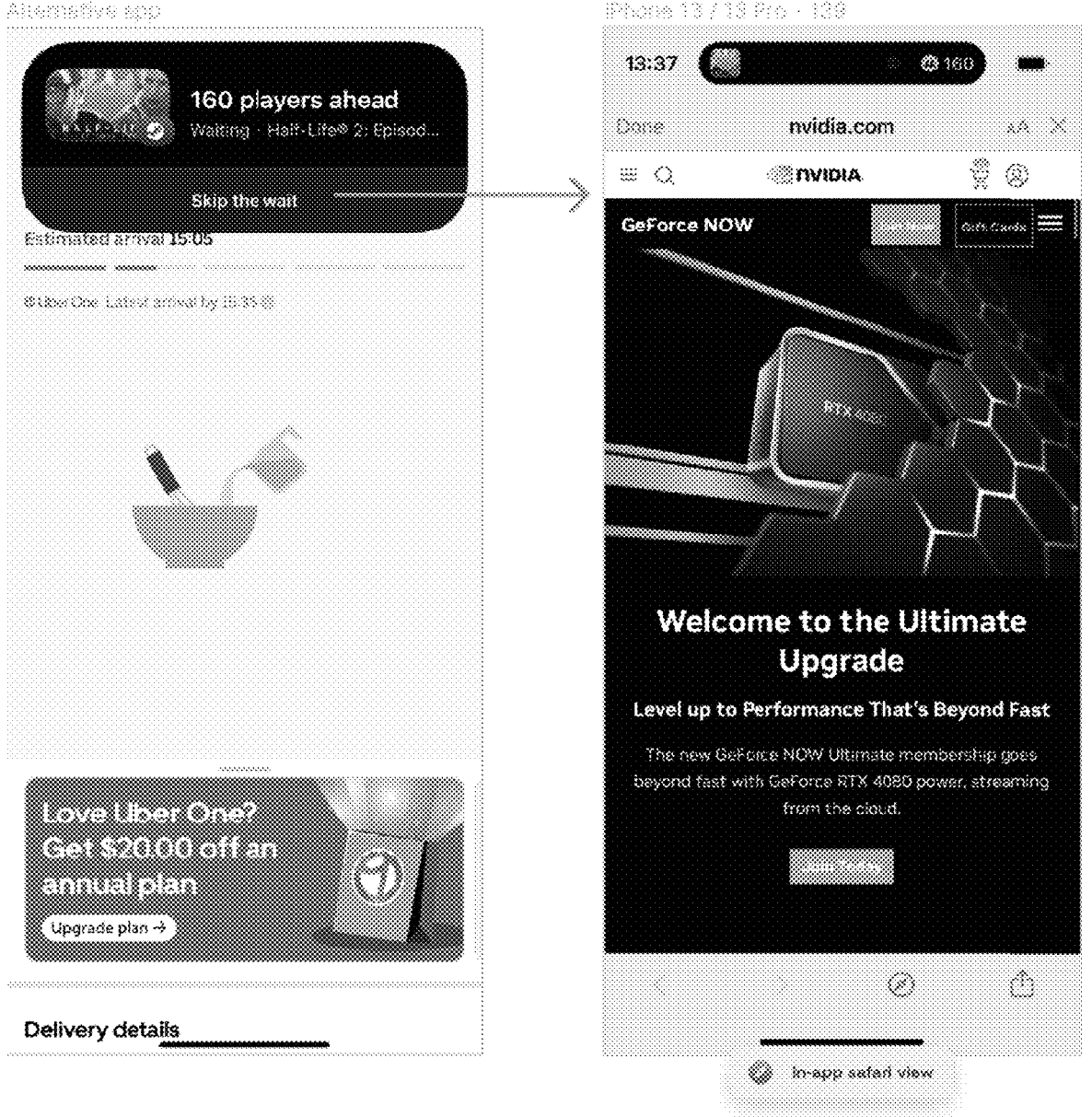
FIGS. 32A-B are screen shots of an embodiment related to offering an upsell to skip a queue.

Turning now to FIG. 31, FIG. 31 shows a game icon that is displayed (surfaced) to let the user know which game they are queuing up for at the moment. This icon is a persistent reminder to the user. Also, FIGS. 32A-B show that the user can be presented with an upsell option to allow the user to progress in the queue (e.g., to move ahead in the queue or to skip the queue altogether). This option can be presented in a dynamic island/live activity component.

There are many alternatives that can be used with these embodiments. For example, in one alternative, program instructions received from the server 410 can, when executed, cause the computing device 200 to determine which state the user is currently in and retrieve specific information that the server 410 needs in order to make the next decision. Within iOS and Android, there exists facilities for WebViews, operating service level functionality, that allow injection of arbitrary JavaScript code. JavaScript code can be evaluated on the page, and information can be retrieved about the user's current state without the utilization of APIs from the aforementioned Cloud Game Platform. The JavaScript code payload sent by the server 410 can ascertain at which point the user is in and when a user is in a games catalog page, a cloud gaming waiting state, or a cloud gaming instance ready state, for example. This information can then be communicated to the server 410, which can determine the next actions to take.

The JavaScript code sent by the server 410 can collect all pertinent information to where the user's current progress is. The current progress of the user can be determined by the various factors, including the HTML on the page, cookies, cache, and local/session storage, all of which can be processed by the Javascript on the client and then information relating to cloud session state can be sent to the server. This information can include, for example, queue position, queue estimated wait time, and current game the user is playing. In another embodiment all the relevant information is uploaded to the server for making the determination. In one embodiment, a single payload is used. With a single payload paradigm, the server 410 can use a link to a Javascript payload which is loaded by the Client to determine both objectives stated above. The advantage of this is simplicity and speed. The information gathered can be both event-based and page specific, and this would allow the computing device 200 to load the user script onto the page then continuously call the functions created.

In another embodiment, the information processed by the embedded script on the client can be sent to the server 410 for processing. The updated information can then be sent back to the client to update various graphical interfaces.

In contrast, with an event-based payload, the two objectives are decoupled, with one endpoint used to detect the current state of the page the user is on and another endpoint used to retrieve the information from the page. One advantage to this approach is the focus on attending to problems with scraping (since the objectives are decoupled, problems with scraping may be more-easily detected). However, the single payload approach can improve developer experience and focus, as well as be segmented by platform, thereby keeping all related code in a single file, which may be simpler over time.

There are many alternatives that can be used with these embodiments. For example, instead of using these embodiments when a user is in a queue waiting to play a game, these embodiments can be use to keep an active session running if the user needs to multi-task during game play (e.g., as part of cloud session management). That is, these embodiments can be expanded to include the situation where a user is playing a game and not only when queuing for a game. As another example, these embodiments can be used on any shared server or even a local server that prepares a stream.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A computing device comprising:

one or more processors;

a non-transitory computer-readable medium; and program instructions stored on the non-transitory computer-readable medium that, when executed by the one or more processors, cause the one or more processors to perform functions comprising:

displaying a browser on the computing device to launch a game on a cloud streaming service in response to a request from a user, wherein the cloud streaming service places the user in a queue prior to allowing the user to play the game;

receiving, from the cloud streaming service, a web page comprising a location containing information about the user's wait in queue;

receiving, from a server, additional program instructions after the server has monitored a layout of the web page and determined the location that, when executed by the one or more processors, further cause the one or more processors to perform functions comprising scraping the information about the user's wait in the queue from the location in the web page, wherein without the additional program instructions, the computing device would not know the location in the web page from which to scrape the information about the user's wait in the queue;

receiving a signal from a game controller in communication with the computing device indicating actuation of a user input element of the game controller; and in response to receiving the signal from the game controller:

hiding a display of the browser without closing the browser so the user's position in the queue is not lost;

scraping the information about the user's wait in the queue from the location in the web page using the additional program instructions received from the server; and displaying the information about the user's wait in the queue.

2. The computing device of claim 1, wherein the program instructions, when executed by the one or more processors, further cause the one or more processors to perform functions comprising:

receiving a dynamically-updated version of the additional program instructions from the server to account for a change in the location that contains information about the user's wait in the queue.

3. The computing device of claim 1, wherein the program instructions, when executed by the one or more processors, further cause the one or more processors to perform functions comprising:

informing the server of an identification of the game that was launched on the cloud streaming service, wherein the server is configured to use the identification of the game to select the additional program instructions to send to the computing device.

4. The computing device of claim 1, wherein the information about the user's wait in the queue comprises the user's position in the queue.

5. The computing device of claim 1, wherein the information about the user's wait in the queue is displayed using a notification, a persistent indicator, an icon, a dynamic island, and/or a live activity notification.

6. The computing device of claim 1, wherein the additional program instructions comprise embedded code.

7. The computing device of claim 1, wherein the additional program instructions are part of a single payload.

8. The computing device of claim 1, wherein the additional program instructions are part of an event-based payload.

9. The computing device of claim 1, wherein the program instructions, when executed by the one or more processors, further cause the one or more processors to perform functions comprising:

in response to the user progressing out of the queue, re-displaying the browser to allow the user to play the game.

10. The computing device of claim 1, wherein the information about the user's wait in the queue comprises an estimated remaining time in the queue.

11. A method comprising:

performing by a computing device coupled with a mobile game controller:

launching a game from a remote game service, wherein a user is placed in a queue prior to being able to play the game;

receiving, from the remote game service, a web page comprising a location containing information about the user's wait in the queue;

receiving, from a server, program instructions after the server has monitored a layout of the web page and determined the location for obtaining information about the user's wait in the queue from a location in the game, wherein without the program instructions, the computing device would not know the location from which to obtain the information about the user's wait in the queue;

receiving a signal from the mobile game controller; and in response to receiving the signal from the game controller:

removing a display of the game without causing the user's position in the queue to be lost;

obtaining the information about the user's wait in the queue from the location; and displaying the information about the user's wait in the queue.

12. The method of claim 11, wherein the information about the user's wait in the queue is obtained using an application program interface.

13. The method of claim 11, wherein the information about the user's wait in the queue is obtained by using an algorithm to estimate the information.

14. The method of claim 11, further comprising performing the method for a plurality of queues.

15. The method of claim 11, further comprising:

providing an upsell option to allow the user to skip the queue.

16. A non-transitory computer-readable medium storing program instructions that, when executed by one or more processors in a server, cause the one or more processors to perform functions comprising:

receiving, from a computing device, an identification of a game that a user of the computing device is attempting to play, wherein the game places the user in a queue prior to allowing the user to play the game;

monitoring a layout of a web page comprising a location that contains information about a user's wait in queue;

generating program instructions configured to scrape the queue wait information from the location; and sending, to the computing device, program instructions that, when executed by one or more processors in the computing device, cause the one or more processors in the computing device to perform functions comprising scraping information about the user's wait in the queue from the location in the web page, wherein without the program instructions, the computing device would not know the location in the web page from which to scrape the information about the user's wait in the queue.

17. The non-transitory computer-readable medium of claim 16, wherein the program instructions, when executed by the one or more processors in the server, further cause the one or more processors to perform functions comprising: sending, to the computing device, a dynamically-updated version of the program instructions to account for a change in the location.

18. The non-transitory computer-readable medium of claim 16, wherein the program instructions, when executed by the one or more processors in the server, further cause the one or more processors to perform functions comprising:

receiving, from the computing device, the information about the user's wait in the queue; and sending, to the computing device, a notification to display to the user regarding the information about the user's wait in the queue.

19. The non-transitory computer-readable medium of claim 16, wherein the program instructions comprise embedded code.

* * * * *